United States Patent [19]

Ogawa et al.

[11] Patent Number: 4,536,531
[45] Date of Patent: Aug. 20, 1985

[54] POLYESTER RESIN COMPOSITION

[75] Inventors: Yoshinari Ogawa; Noriyuki Akagi, both of Sagamihara, Japan

[73] Assignee: Teijin Limited, Osaka, Japan

[21] Appl. No.: 496,059

[22] Filed: May 19, 1983

Related U.S. Application Data

[63] Continuation-in-part of Ser. No. 343,456, Jan. 28, 1982, abandoned.

[30] Foreign Application Priority Data

Jan. 30, 1981 [JP] Japan .................. 56-11549
May 8, 1981 [JP] Japan .................. 56-68106
Jul. 17, 1981 [JP] Japan .................. 56-110804

[51] Int. Cl.$^3$ .................. C08L 67/02; C08L 67/04
[52] U.S. Cl. .................. 524/135; 524/133; 524/417; 524/145; 524/147; 524/152; 524/153; 524/394; 524/400; 524/425; 524/445; 524/451; 524/452; 524/456; 524/513; 524/539; 524/414; 525/411; 525/437; 525/438
[58] Field of Search .............. 525/411, 415, 166, 437; 524/539, 513, 605, 394, 400, 451, 425, 452, 445, 456, 133, 135, 417, 145, 147, 152, 153, 414

[56] References Cited

U.S. PATENT DOCUMENTS

| | | | |
|---|---|---|---|
| 3,583,935 | 6/1971 | Weissermel | 523/440 |
| 3,835,089 | 9/1974 | Fox | 525/411 |
| 3,892,821 | 7/1975 | Koleske | 525/411 |
| 4,212,791 | 7/1980 | Avery | 524/539 |
| 4,222,928 | 9/1980 | Kawamura | 523/451 |
| 4,223,113 | 9/1980 | Bier | 525/444 |

FOREIGN PATENT DOCUMENTS

| | | | |
|---|---|---|---|
| 47-45820 | 11/1972 | Japan | 525/411 |
| 49-27091 | 7/1974 | Japan | 525/411 |
| 2015014 | 9/1979 | United Kingdom | |

Primary Examiner—John C. Bleutge
Assistant Examiner—Patricia Short
Attorney, Agent, or Firm—Burgess, Ryan & Wayne

[57] ABSTRACT

A polyester resin composition having excellent molding mobility and crystallizing property, comprises (A) at least one thermoplastic polyester resin selected from polyethylene terephthalate resins and polybutylene terephthalate resins; (B) a polycaprolactone having a number average molecular weight of from 200 to 2,000 in an amount of 0.1 to 30 parts by weight per 100 parts by weight of the polyester resin, in which polycaprolactone molecules, at least 50% of the terminal radicals thereof, are modified to be non-reactive, (C) 0.01 to 10 parts by weight of a crystal nucleating agent per 100 parts of the polyester resin, and optionally, (D) at least one additive selected from fillers and specific phosphorous compounds which may be in combination with a specific epoxy compound, the polyester resin composition being useful for producing a molded product having an excellent dimensional stability and mechanical strength.

9 Claims, No Drawings

POLYESTER RESIN COMPOSITION

This application is a continuation-in-part of application Ser. No. 343,456, filed January 28, 1982, now abandoned.

BACKGROUND OF THE INVENTION

1. Field of the Invention

The present invention relates to a polyester resin composition. More particularly, the present invention relates to a thermoplastic polyester resin composition having a high crystallinity and excellent moldability, mechanical strength and dimensional stability.

2. Description of the Prior Art

It is known that polyester resins, for example, polyethylene terephthalate resins, have excellent mechanical properties, chemical resistance, heat resistance and electrical properties and, therefore, are widely utilized in the production of electrical insulating materials, automobile parts and the like. The above-mentioned properties can be enhanced by the addition of various additives, for example, fiber reinforcement, e.g. glass fibers or carbon fibers, function-imparting materials, e.g. flame retarder, antistatic agent or antioxidant, and the like. Due to the enhancement, the use of polyester resins has increasingly been broadened.

It is also known that generally, the properties of a crystalline polymer resins, such as polyethylene terephthalate resins, are variable, largely depending on the degree of crystallinity thereof.

Therefore, it is possible to increase various properties, such as dimensional stability and resistances to chemicals and heat (heat deflection temperature) of the polyester resin, by enhancing the degree of crystallinity of the polyester resin.

There have been various attempts to increase the degree of crystallinity of the polyester resins. For example, U.S. Pat. No. 3,368,995 discloses a method in which a molded polymer resin article is prepared in a partially crystallized state and, then, subjected to a post-heat treatment to complete the crystallization of the article. In another known method, the molded polyester resin article in the partially crystallized state is immersed in a treating liquid capable of promoting the crystallization of the polyester resin.

However, the above-mentioned known methods are disadvantageous in that, after the molding procedure, it is necessary to apply a certain post-treatment to the molded article, and, therefore, such methods are not always satisfactory.

British Pat. No. 1,111,012 discloses still another method in which the molding procedure is carried out by injecting a polyester resin melt into a mold which has been heated to a temperature of approximately 140° C. and then, solidifying the molded polymer resin in the mold so as to accelerate the crystallization of the polymer resin. However, this method is disadvantageous in that the use of a heating medium is necessary to maintain the temperature of the mold at the desired high level, which is undesirable from the point of view of safety and of saving energy in the molding procedure, and in that the molding cycle time becomes long.

In order to eliminate the above-mentioned disadvantages of the prior art, attempts were made to utilize various crystal nucleus-forming agents so as to accelerate the crystallization of the polyester resin. For example, British Pat. No. 1,111,012 also discloses a method of accelerating the crystallization of the polyester resin by adding thereto a crystal nucleating agent comprising an inorganic solid substance, such as talc, carbon black or graphite, or an organic solid substance, such as metal salts of organic monocarboxylic acids.

Although the addition of the crystal nucleating agent is effective for shortening the molding cycle time to a certain extent, there is still room for improvement. For example, even in the case where a crystal nucleating agent is added to a polyester resin and the resultant mixture is injected into a mold while the temperature of the mold is maintained at a level of 85° C. to 110° C., since the velocity of crystallization of the polyester resin in the mold is unsatisfactorily low, the separation of the resultant molded product from the mold becomes unsatisfactory and a long time period of the cooling procedure must be applied to the molded product. Also, since the crystallization of the molded polyester resin product is not completed in the mold, the resultant product exhibits an unsatisfactory resistance to heat when the product has a small thickness. If this type of product is exposed to a high temperature atmosphere, an additional crystallization of the polyester resin takes place, which results in changes in the dimensions of the product.

Polybutylene terephthalate resin exhibits such an advantageous property that, even if the temperature of the injection mold is 100° C. or less, the injected resin is easily crystallized uniformly in the mold, and, therefore, the molded product has a uniform crystallinity from the center portion to the surface layer of the molded product. That is, polybutylene terephthalate resin has an excellent moldability, similar to that of nylon resins and polyacetal resins. However, polybutylene terephthalate resins are disadvantageous in that the shrinkage thereof in the molding procedure is undesirable large and the heat resistance thereof is unsatisfactory.

Various attempts were carried out to obtain a mixture of polyethylene terephthalate resin with polybutylene terephthalate, having a reduced shrinkage and enhanced heat resistance. These attempts are disclosed, for example, in Japanese Unexamined Patent Publication (Kokai) Nos. 50-33832 (1975), 53-92862 (1978), and 54-94556 (1979). However, the improved properties of the above-mentioned mixtures are still unsatisfactory.

Recently, there has been a tendency whereby some molded materials are required to have an enhanced function, a reduced weight and a reduction in the amount of raw materials consumed. In order to meet with the above-mentioned requirements, polyester materials are molded into a complicated shape with a small thickness or size and a compact structure. In this case, it is indispensable that the melt of a polyester material to be molded exhibits excellent mobility in a mold during the molding procedure.

The mobility of the melted thermosplastic polyester resin largely depends on the molecular weight of the polyester resin. It is well known that the higher the molecular weight of the polyester resin, the lower the mobility of the melt of the polyester resin. Therefore, a polyester resin having a low molecular weight may be used as a molding thermoplastic polyester resin having a satisfactory mobility.

However, it is also well known that the mechanical strength, for example, tensile strength and toughness, such as flexural strength, of the molded material depends on the molecular weight of the polyester resin. That is, the lower the molecular weight of the polyester resin, the poorer the mechanical strength of the molded product from the polyester resin. When a thermoplastic polyester resin having a low molecular weight is molded, the resultant product exhibits a poor mechanical strength. If the polyester resin having a low molecular weight and, therefore, exhibiting a high mobility, is used for producing a molded product having a small thickness, the resultant molded product naturally exhibits very poor mechanical strength and, therefore, is useless for actual use.

Various attempts were made to provide molded products having enhanced mechanical strength. For example, U.S. Pat. No. 3,578,729 discloses a mixture of a thermoplastic polyester resin with an acrylic type ester-ethylene copolymer; U.S. Pat. No. 3,591,659 discloses a mixture of a thermoplastic polyester resin with a polyacrylic aliphatic ester; Japanese Examined Patent Publication (Kokoku) No. 46-5224 discloses a mixture of a thermoplastic polyester resin with a rubber-like polymer such as butyl rubber; U.S. Pat. No. 3,368,995 discloses a mixture of a thermoplastic polyester resin with glass fibers; Japanese Examined Patent Publication (Kokoku) No. 48-32948 discloses a mixture of a thermoplastic polyester resin with aromatic polyamine fibers; and Japanese Examined Patent Publication (Kokoku) No. 48-6175, U.S. Pat. No. 3,553,157, and U.S. Pat. No. 3,583,935 disclose mixtures of polyester resins with epoxy compounds.

However, the above-mentioned attempts resulted in decreased mobilities of the resultant polymer mixtures. Therefore, the polymer mixtures were not suitable for molding a product having a small thickness.

SUMMARY OF THE INVENTION

An object of the present invention is to provide a polyester resin composition which is capable of providing a molded product having excellent dimensional stability and heat resistance at low cost, even when the molding procedure is carried out at a relatively low temperature of the mold of 110° C. or less.

Another object of the present invention is to provide a polyester resin composition which has enhanced mobility when melted and which is capable of providing a molded product having excellent toughness.

The above-mentioned objects can be attained by the polyester resin composition of the present invention which comprises:

(A) at least one thermoplastic polyester resin selected from the group consisting of polyethylene terephthalate resins and polybutylene terephthalate resins; and (B) per 100 parts by weight of the polyester resin, 0.1 to 30 parts by weight of a polycaprolactone having a number average molecular weight of from 200 to 2,000, which polycaprolactone molecules have terminal radicals thereof modified to be nonreactive and in the number corresponding to 50% or more of the entire number of the terminal radicals in the polycaprolactone molecules; and (C) 0.01 to 10 parts by weight of a crystal nucleating agent for the polyester resin, per 100 parts by weight of the polyester resin.

Since at least 50% of the terminal radicals of the polycaprolactone molecules are modified to be nonreactive, the resultant polyester resin composition can be molded at an elevated temperature without decreasing the degree of polymerization of the polyester resin and without deteriorating the physical and chemical properties of the molded composition.

The polyester resin composition of the present invention contains a crystal nucleating agent and optionally an additive selected from inorganic fillers. The crystal nucleating agent is effective for promoting the start of crystallization of the polyester resin.

The inorganic filler is effective for enhancing the mechanical strength, the surface property, electric properties and/or thermal properties of the polyester resin compound.

Also, the polyester resin composition of the present invention may additionally contain at least one phosphorus compound selected from those of the formulae (II) and (III)

and

wherein X, Y and Z respectively represent, independently from each other, a member selected from the group consisting of a hydrogen atom, radicals of the formula -OR$^3$ in which R$^3$ represents a member selected from a hydrogen atom and monovalent hydrocarbon radicals.

The above-mentioned phosphorus compounds are effective for enhancing moldability and crystallinity of the polyester resin composition at a relatively low molded temperature.

Furthermore, the polyester resin composition of the present invention may additionally contain, together with the above-mentioned phosphorus compound, at least one epoxy compound selected from those of the formula (IV):

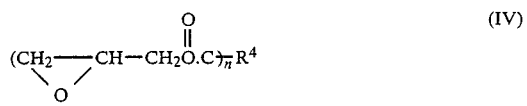

wherein n represents an integer of 2 or more and R$^4$ represents a hydrocarbon radical having the number of valences corresponding to n.

The combination of the phosphorus compound with the epoxy compound is effective for increasing the heat resistance of the polyester resin composition.

DESCRIPTION OF THE PREFERRED EMBODIMENTS

The polyester resin composition of the present invention comprises a component (A) consisting of at least one thermoplastic polyester resin selected from polyethylene terephthalate resins and polybutylene terephthalate resins, 0.1 to 30 parts by weight of a component (B) consisting of a polycaprolactone having a number average molecular weight of from 200 to 2,000, per 100 parts by weight of the component (A) and 0.01 to 10 parts by weight of a crystal nucleating agent for the component (A) per 100 parts by weight of the component (A). The polycaprolactone molecules have terminal radicals thereof modified to be non-reactive and in the number corresponding to 50% or more of the entire number of the terminal radicals of the polycaprolactone molecules.

The polyethylene terephthalate resins usable for the present invention consist of at least one member selected from polyethylene terephthalate homopolymers which are obtainable from an acid component, such as terephthalic acid or an ester-forming derivative thereof, and a glycol component, such as ethylene glycol or an ester-forming derivative thereof, and polyethylene terephthalate copolymers in which the above-mentioned acid component contains a small amount of at least one copolymerizable dicarboxylic acid in addition to terephthalic acid or its derivative, and/or the above-mentioned glycol component contains a small amount of at least one copolymerizable diol compound, in addition to ethylene glycol or its derivative.

The copolymerizable dicarboxylic acids may be selected from aromatic dicarboxylic acids, for example, isophthalic acid, phthalic acid, alkyl-substituted phthalic acids, e.g. methylterephthalic acid and methylisophthalic acid, naphthalene-dicarboxylic acids, e.g. naphthalene-2,6-dicarboxylic acid, naphthalene-2,7-dicarboxylic acid, and naphthalene-1,5-dicarboxylic acid, and diphenoxyethane dicarboxylic acids, e.g. 4,4'-diphenoxyethanedicarboxylic acid; aliphatic dicarboxylic acids, for example, succinic acid, adipic acid, sebacic acid, azelaic acid and decadicarboxylic acid; and alicyclic dicarboxylic acids, for example, cyclohexanedicarboxylic acid.

The copolymerizable diol compounds may be selected from aliphatic and alicyclic diols, such as trimethylene glycol, tetramethylene glycol, hexamethylene glycol, neopentyl glycol, diethylene glycol, 1,4-cyclohexanedimethanol; dihydroxybenzenes, such as hydroquinone and resorcinol; bisphenols, such as 2,2-bis(4-hydroxydiphenyl)-propane and 2,2-bis(4-hydroxydiphenyl)-sulfone and aromatic diols, such as ether diols obtainable from bisphenols and glycols such as ethylene glycol.

Also, hydroxycarboxylic acids, such as ε-hydroxycaproic acid, hydroxyethoxybenzoic acid and hydroxyethoxybenzoic acid are usable as a part of the acid component.

These copolymerizable components may be employed alone or as a mixture of two or more thereof. Preferably, they are employed in an amount of not more than 20 molar %, more preferably, 10 molar % or less, of the total amount of the acid component (hydroxycarboxylic acids should be calculated as a half thereof being the carboxylic acid), or of the glycol component.

The polyethylene terephthalates usable for the present invention may have, in molecular structure, at least one branched chain derived from copolymerization of a small proportion of a trifunctional ester-forming acid, such as tricarballylic acid, trimesic acid or trimellitic acid; a tetrafunctional ester-forming acid, such as pyromellitic acid; a trifunctional ester-forming alcohol compound, such as glycerine or trimethylolpropane; or a tetrafunctional ester-forming alcohol compound, such as pentaerythritol. The polyfunctional compounds are used preferably in a proportion of 1.0 molar % or less, more preferably, 0.5 molar % or less, still more preferably, 0.3 molar % or less.

The polyethylene terephthalate resins usable for the present invention preferably have an intrinsic viscosity of 0.35 or more, more preferably 0.45 or more, determined in a solvent consisting of ortho-chlorophenol at a temperature of 35° C. The use of a polyethylene terephthalate resin of an intrinsic viscosity less than 0.35 sometimes may provide a molded article of a low strength. When the polyester resin composition contains no filler, it is preferable that the polyethylene terephthalate resin have an intrinsic viscosity of from 0.35 to 1.5, more preferably, from 0.4 to 1.2. When the intrinsic viscosity of the polyester resin is excessively large, the resultant resin composition exhibits an unsatisfactory moldability.

When the polyester resin composition contains a large amount of reinforcing fibers, for example, glass fibers, as a filler, it is preferable that the polyethylene terephthalate resin have an intrinsic viscosity of from 0.35 to 0.9, more preferably, from 0.4 to 0.8, because the reinforcing fibers results in a reduced mobility of the resultant composition.

The polyethylene terephthalate resins usable for the present invention can be prepared by a usual polymerization method, for example, a melt polymerization method or a combination of a melt polymerization and solid phase polymerization.

The polybutylene terephthalate resins usable for the present invention consist of at least one member selected from polybutylene terephthalate homopolymers and copolymers. The homopolymers are obtained from an acid component consisting of terephthalic acid or its ester-forming derivative and a glycol component consisting of tetramethylene glycol or its ester-forming derivative. In the polybutylene terephthalate copolymers, the acid component and/or the glycol component contain a small amount of copolymerizable compounds, which may be selected from ethylene glycol and the same copolymerizable compounds as those usable for the polyethylene terephthalate copolymers, except for tetramethylene glycol.

It is preferable that the polybutylene terephthalate resins exhbit an intrinsic viscosity of from 0.4 to 1.5, more preferably, 0.5 to 1.2, determined in ortho-chlorophenol at a temperature of 35° C.

The polybutylene terephthalate resins usable for the present invention can be produced by usual polymerization methods, for example, a melt polymerization method or a solid phase polymerization method.

The polyester resin usable for the present invention preferably consists of a polyethylene terephthalate resin or polybutylene terephthalate alone or a mixture of 5 to 95%, more preferably, 20 to 90%, still more preferably, 40 to 90%, by weight of a polyethylene terephthalate resin and 5 to 95%, more preferably, 10 to 80%, still more preferably, 10 to 60% by weight of a polybutylene terephthalate.

The above-mentioned preferable polyester resins exhibit an excellent heat resistance, a reduced shrinkage and mobility during the molding procedure and an enhanced moldability and toughness and are useful for producing molded products having a satisfactory appearance.

The polyester resin composition of the present invention contains, as a component (B), a modified polycaprolactone having a number average molecular weight of from 200 to 2,000, preferably from 300 to 1,800, more preferably from 400 to 1,600. The polycaprolactone can be prepared by the ring-opening polymerization of ε-caprolactone in the presence of a cationic or anionic polymerization-initiating agent.

It was found for the first time by the inventors of the present invention that the polycaprolactone, which has been modified as clarified hereinafter, is highly effective for promoting the crystallization of the polyester resin. This effect of the polycaprolactone can be further promoted by using a crystal nucleating agent which will be clarified thereinafter.

It was also found by the inventors of the present invention for the first time that the polycaprolactone capable of promoting the crystallization of the polyester resin must have a number average molecular weight of from 200 to 2,000. When the number average molecular weight is more than 2,000, the polycaprolactone exhibits substantially no, or a very poor, effect of promoting the crystallization of the polyester resin. Also, when the number average molecular weight is less than 200, the resultant polyester resin composition results in a practically useless molded product having a significantly decreased mechanical strength. The reason of the decrease in the mechanical strength of the molded product is not completely clear. It is assumed, however, that in the melt-mixing procedure of the polyester resin with polycaprolactone to provide a polyester resin composition or in the molding procedure of the resultant polyester resin composition, the polycaprolactone having a low molecular weight reacts with a polyester resin and this reaction results in a decrease in the molecular weight of the polyester resin.

Accordingly, it is necessary that the number average molecular weight of the polycaprolactone to be used for the present invention is in a range of from 200 to 2,000, preferably from 300 to 1,800, more preferably, 400 to 1,600.

The component (B) is used in an amount of from 0.1 to 30 parts by weight, preferably, from 0.5 to 10 parts by weight per 100 parts by weight of the polyester resin. If the amount of the component (B) is less than 0.1 parts by weight, the resultant composition exhibits an unsatisfactory crystallization rate. The effect of promoting the crystallization of the polyester resin reaches a substantially maximum when the amount of component (B) reaches 20 parts by weight. That is, an increase in the amount of component (B) to more than 30 parts by weight is not only not effective for increasing the effect of promoting the crystallization of the polyester resin, but also results in a decrease in the mechanical properties of the molded product.

The ring-opening polymerization of ε-caprolactone is carried out in the presence of a polymerization initiator (catalyst). The catalyst may consist of at least one member selected from monohydric alcohols, for example, n-hexylalcohol, n-heptylalcohol, n-octylalcohol, n-nonylalcohol, laurylalcohol and myristylalcohol; glycol compounds, for example, ethylene glycol, propylene glycol, ethylethylene glycol, 2-methyl-1,2-propanediol, pinacol, ε-butylene glycol, diethylene glycol, tetramethylene glycol, neopentyl glycol and 1,4-cyclohexane dimethanol; trihydric alcohols, for example, glycerine, 1,2,3-butane-triol and 1,2,3-pentane-triol; tetrahydric alcohols, for example, erythritol and pentaerythritol; monovalent carboxylic acids, for example, benzoic acid, p-methylbenzoic acid lauric acid and myricylic acid; divalent carboxylic acids, for example, isophthalic acid, phthalic acid, terephthalic acid, 2,6-naphthalene dicarboxylic acid, 4,4'-diphenoxyethane dicarboxylic acid, citric acid, adipic acid, sebacic acid, azelaic acid, decadicarboxylic acid and cyclohexane dicarboxylic acid; trivalent carboxylic acid, for example, tricarballylic acid, trimesic acid and trimellitic acid; tetravalent carboxylic acids, for example, pyromellitic acid; and hydroxycarboxylic acid, for example, ε-hydroxycarboxylic acids and hydroxyethoxybenzoic acids.

When ε-caprolactone is ring-opening polymerized in the presence of the above-mentioned initiator, the ring-opening polymerization reaction may be accelerated by using a catalyst consisting of a member selected from tin compounds, for example, tetraoctyl tin and diphenyltin-dilaurate, and titanium compounds, for example, tetrabutyl titanate.

The polycaprolactone usable for the present invention is modified in such a manner that at least 50% of the terminal radicals of the polycaprolactone molecules are modified with a blocking agent, so that the modified terminal radicals become non-reactive.

The non-modified polycaprolactone molecules have terminal radicals thereof, each consisting of a free carboxyl radical or hydroxyl radical which is highly reactive. The reactive terminal radicals can be converted to non-reactive radicals by reacting the terminal radicals with a monovalent blocking agent, the molecule of which has a moiety reactive with the carboxylic and/or hydroxyl radical and another moiety which is non-reactive.

The type of the terminal radicals in the polycaprolactone molecules is variable, depending on the type of the ring-opening polymerization initiator used. When the initiator consists of an alcohol compound, the resultant terminal radicals consist of a hydroxyl radical. When the initiator consists of a carboxylic acid compound, the resultant terminal radicals consist of a carboxylic radical. When the initiator consists of a hydroxycarboxylic acid or water, the resultant terminal radicals consist of a hydroxyl radical and a carboxyl radical.

In the above-mentioned compounds usable as the initiator, preferable compounds are glycol compounds.

It is necessary that the number of the modified terminal radicals in the polycaprolactone molecules correspond to 50% or more, more preferably, 70% or more, of the entire number of the terminal radicals in the polycaprolactone molecules. It is ideal that the terminal radicals in the polycaprolactone be entirely modified to non-reactive radicals, in order to completely stabilize the polycaprolactone in the molding procedure at an elevated temperature.

In the modification, the polycaprolactone is brought into reaction with a blocking monovalent compound, which has a reactive moiety capable of reacting the terminal carboxyl or hydroxyl radicals in the polycaplolactone, and a non-reactive moiety which becomes a non-reactive terminal radical of the modified polycaprolactone after the blocking compound reacts with the polycaprolactone.

The reaction between the blocking compound with the polycaprolactone may be of any type selected from the ester-, ether, urethane and amideforming reactions. However, the preferable type of reaction is an ester-forming reaction. The blocking compound usable for the ester-forming reaction can be selected from, for example, monovalent carboxylic acids and ester-forming derivatives thereof, when the terminal radicals are hydroxyl radicals, and monovalent alcohols or ester-forming derivatives thereof, when the terminal radicals are carboxyl radicals. The monovalent carboxyl acids and ester-forming derivatives may be selected from acetic acid, propionic acid, butyric acid, valeric acid, caproic acid, heptanoic acid caprylic acid, lauric acid, myristicic acid, benzoic acid, toluic acid, dimethyl benzoic acid, ethyl benzoic acid, cuminic acid, 2,3,4,5-tetramethylbenzoic acid, and ester-forming anhydrides, acid halides and esters of the above-mentioned carboxylic acids, for example, phenyl acetate, ethyl caproate, methyl benzoate and ethyl toluate.

The monovalent alcohols and ester-forming derivative thereof involve methyl alcohol, ethyl alcohol, n-propyl alcohol, isopropyl alcohol, isobutyl alcohol, n-amylabiohol, lauryl alcohol and esters of the above-mentioned alcohols, for example, halo-carbonic esters and carboxylic esters of the above-mentioned alcohols.

In order to prepare the terminal-modified polycaprolactone, a known ester-forming reaction can be applied between the polycaprolactone and the blocking compound.

The preferable terminal-modified polycaprolactone is of the formula (I):

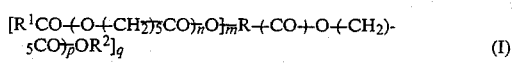  (I)

wherein n and p respectively represent, independently from each other, an integer of 2 or more; m and q respectively represent, independently from each other, zero or an integer of from 1 to 4 and the sum of m and q is 1 or more; R represents an organic radical having a valence corresponding to the sum of m +q; and $R^1$ and $R^2$ respectively represent, independently from each other, a monovalent organic radical.

In the formula (I), when R represents a residue of a glycol compound, q represents zero, m represents an integer of 2, and $R^1CO—$ represents a residue of a monovalent carboxylic acid used as a blocking compound. When R represents a residue of a dicarboxylic acid, m represents zero, q represents an integer of 2 and $—DR^2$ represents a residue of a monovalent alcohol used as a blocking compound. When R represents a residue of a hydroxycarboxylic acid, m and q are 1, respectively, $R^1CO—$ is a residue of a monocarboxylic acid used as a blocking compound and $—R^2$ is a residue of a monovalent alcohol used as a blocking agent.

The polycaprolactone having modified terminal radicals thereof, are remarkably effective for promoting the crystallization of the polyester resin. This effect is enhanced by concurrently using the terminal-modified polycaprolactone with the crystal nucleating agent. Also, the terminal-modified polycaprolactone is effective for enhancing the mobility of the melt of the polyester resin and for increasing the mechanical strength, tensile elongation, impact strength and toughness of the resultant molded product.

The terminal-modified polycaprolactone have a number average molecular weight of 200 to 2,000, preferably not exceeding 1,800, more preferably not exceeding 1,600.

The terminal-modified polycaprolactone is used in an amount of from 0.1 to 30 parts by weight, preferably, from 0.5 to 15 parts by weight, still more preferably, from 0.5 to 10 parts by weight, based on 100 parts by weight of the polyester resin.

The polyester resin composition may contain, as an additional component, 200 parts by weight or less of an inorganic filler, per 100 parts by weight of the polyester resin. The filler may comprise at least one member selected from glass fibers, asbestos, carbon fibers, potassium titanate fibers and mica, silica, talc calcium carbonate, glass, clay and wollastonite in the form of particles, grains, flakes, and small plates.

The fillers are used for the purpose of enhancing the mechanical strength, surface property, electric property and thermal properties of the polyester resin composition or molded products thereof. Especially, when a filler consisting of glass fibers is blended to the polyester resin composition, the resultant product exhibits not only a highly enhanced mechanical strength, but also highly increased resistances to heat and deformation at an elevated temperature. The above-mentioned effects of the glass fibers are assisted by the polycaprolactone and the crystal nucleating agent used concurrently with the glass fibers.

The glass fibers, usable for the above-mentioned purpose, may be selected from usual reinforcing glass fibers for resinous materials, for example, filamentary type glass fibers (glass rovings), and staple type glass fibers, such as chopped strands and milled fibers. The glass fibers may be treated with a fiber bundle-forming agent comprising a polyvinyl acetate or a polyester, a coupling agent comprising a silane compound or a boran compound or another surface-treating agent. The glass fiber may also be coated with a thermoplastic resin or thermosetting resin. If the glass filaments are used, it is usually preferable for the filaments to be cut into a desired length before or while the filaments are blended to the polyester resin.

When the filler is used, it should be considered that the filler is used in a minimum amount, which is sufficient for attaining the purpose of using the filler. If the filler is used in an excessive amount, the content of the polyester resin in the resultant composition becomes relatively small and, therefore, the properties of the resultant composition, which are derived from the polyester resin, become unsatisfactory. Also, an excessive amount of the filler results in a decrease in moldability, especially, in the mobility of the melted composition in the molding procedure. In consideration of the above-mentioned items, it is preferable that the filler be used in n amount of 200 parts by weight or less, more preferably, 5 to 200 parts by weight, per 100 parts by weight of the polyester resin. If the filler is used in an amount of more than 200 parts by weight, the melt of the resultant polyester composition exhibits poor mobility and, therefore, the resultant molded product exhbits an unsatisfactory appearance. Also, the addition of the additional amount of the filler over 200 parts by weight is not effective for increasing the mechanical strength, heat resistance and other properties of the resultant polyester resin composition.

The polyester resin composition of the present invention contains 0.01 to 10 parts by weight of a crystal nucleating agent for the polyester resin per 100 parts by weight of the polyester resin. The crystal nucleating agent useable for the present invention can be selected from known crystal nucleating agents for usual polyester resin, including polyethylene terephthalate resins, but is not limited to the known crystal nucleating agents.

For example, the crystal nucleating agent comprises at least one member selected from inorganic solid substances, for example, carbon powder, neutral clay, and oxides, sulfates, phosphates and silicates of metals of Group II in the Periodic Table, which are disclosed in Japanese Examined Patent Publication (Kokoku) No. 44-7542 (1969), finely divided pyroferrite which is disclosed in Japanese Examined Patent Publication (Kokoku) No. 45-2622 (1970) titanium dioxide disclosed in Japanese Examined Patent Publication (Kokoku) No. 46-7180 (1971), talc and gypsum disclosed in Japanese Examined Patent Publication (Kokoku) No. 47-3025 (1972), and boron nitride described in Japanese Examined Patent Publication (Kokoku) No. 47-25850 (1970); metal salts of organic carboxylic acids, for example, oxalates, stearates, benzoates, salicylates and tartrates of metals of Group II in the Periodic Table, which are disclosed in Japanese Examined Patent Publication (Kokoku) No. 44-7542 (1969), sodium benzoate disclosed in Japanese Examined Patent Publication (Kokoku) No. 46-29977 (1971), montan wax salts and montan wax ester salts disclosed in Japanese Examined Patent Publication (Kokoku) No. 47-13137 (1972), lithium terephthalate, sodium stearate and potassium benzoates described in Japanese Examined Patent Publication (Kokoku) No. 47-14502 (1972); metal salts of organic sulfonic acids described in Japanese Examined Patent Publication (Kokoku) No. 47-27142 (1972); completely or partially neutralized salts and ester salts of saturated tert-monocarboxylic acid mixtures described in Japanese Examined Patent Publication (Kokoku) No. 47-27780 (1972), sodium, lithium and barium salts of mono- and poly-carboxylic acids described in Japanese Examined Patent Publication (Kokoku) Nos. 47-32435 (1972), 48-4097 (1973) and 48-4098 (1973) and glycolates of alkaline earth metals, titanium, germanium, antimony, tungsten and manganese described in Japanese Examined Patent Publication (Kokoku) No. 48-12861 (1973); and ionic copolymers of α-olefins with α,β-unsaturated carboxylic salts described in Japanese Examined Patent Publication (Kokoku) No. 45-26225 (1970), the crystal nucleating agent consisting of the organic carboxylic acid metal salts alone is used preferably in an amount of 0.01 to 3 parts by weight per 100 parts by weight of component (A). Also, the crystal nucleating agent consisting of the inorganic substances only is used preferably in an amount of 0.1 to 10 parts by weight per 100 parts by weight of the component (A). Furthermore, the crystal nucleating agent consisting of the ionic copolymers alone is used preferably in an amount of 0.5 to 10 parts by weight per 100 parts by weight of the component (A).

In the above-mentioned compounds, preferable compounds for the crystal nucleating agent to be used, in combination with the terminal-modified polycaprolactone, are talc particles having a size of 20 microns or less, carboxylic salts of metals in Groups I and II in the Periodic Table and ionic copolymers of -olefins with α,β-unsaturated carboxylic salts.

The carboxylic salts of metals of Groups I and II in the Periodic Table may be exemplified metal salts of aliphatic monocarboxylic acids, such as acetic acid, propionic acid, caproic acid, palmitic acid, stearic acid, oleic acid, behenic acid, montanic acid, methacrylic acid and acrylic acid; of aliphatic dicarboxylic acids, such as oxalic acid, adipic acid, succinic acid, sebacic acid, maleic acid and fumaric acid; and of aromatic carboxylic acids, such as benzoic acid, terephthalic acid and phthalic acid. Suitable metals are sodium, potassium, lithium, magnesium, calcium barium and zinc. In these carboxylic acid salts, it is unnecessary that all the carboxyl groups by converted into salt form thereof, but a part of the carboxyl groups may be in a salt form and the remaining groups may be in a free acid or ester form.

The ionic copolymers may be prepared by a known method as described, for example, in Japanese Patent Application Publication (Kokoku) No. 39-6810 (1964).

Examples of the ionic copolymer are those polymers having the units of the following structural formula,

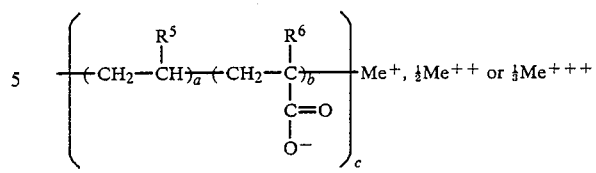

in which $R^5$ represents a hydrogen atom, an alkyl radical having 1 to 12 carbon atoms or a phenyl radical; $R^6$ represents a hydrogen atom, or a methyl or ethyl radical; Me represents metal ion of Group I or II in the Periodic Table; a, b and c respectively represent, independently for each other an integer of 1 or more.

Ionic copolymers of an α-olefin and an α,β-unsaturated dicarboxylic acid salt, for example, of ethylene and maleic acid or itaconic acid, and containing ionic groups of metal of Group I or II in the Periodic Table may also be used.

Other examples of the ionic copolymer are ionic graft copolymers obtained, for example, by grafting an α,β-unsaturated carboxylic acid ester to a polyolefin, by saponifying the graft polymer and then reacting it with an alkali metal hydroxide. The above-mentioned ionic copolymers should preferably have an olefin content of at least 50% by weight. Copolymers having an olefin content of 80 to 99% by weight may especially be suitable.

Further examples of a ionic copolymers are those copolymers having the following units (A), (B) and (C),

  (A)

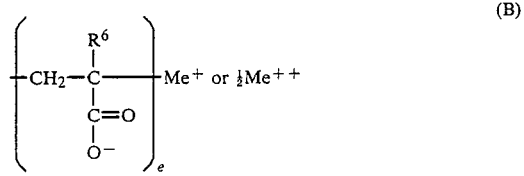  (B)

  (C)

in which $R^5$, $R^6$ and Me are as defined above, $R^7$ represents a hydrogen atom or a methyl or ethyl radical, $R^8$ represents a hydrogen atom or an alkyl radical having 1 to 12 carbon atoms, and d, e and f respectively represent, independently from each other, an integer of 1 or more. These ionic copolymers should preferably have an olefin content of at least 50% by weight, with those having an olefin content of 80 to 90% by weight being especially preferable. Preferably, the total content of the ester component ((C)) and the ionic component ((B)) may be at least 10% by weight and the content of the ionic component ((B)) may be at least 3% of the weight of the ionic copolymer. All the carboxyl groups of the ionic copolymer need not always be neutralized, but at least 10% of the carboxyl groups should be neutralized by metal ions. The metal ions may be selected from ions of the metals described in Japanese Examined Patent Publication (Kokoku) No. 39-6810 (1964).

Especially preferable metal ions are alkali metal ions, particularly the sodium ion. Especially preferable ionic copolymers are those of ethylene and methacrylic acid and containing an alkali metal ion, particularly the sodium ion.

The crystal nucleatng agent is used usually in an amount of 0.01 to 10 parts by weight, preferably from 0.05 to 10 parts by weight, per 100 parts by weight of the polyester resin.

An excessive amount of over 10 parts by weight of the crystal nucleating agent is not only not effective for promoting the crystallization of the polyester resin but also, results in decreases in the mechanical strength and other properties of the resultant molded product. A too small amount of less than 0.01% by weight of the crystal nucleating agent is unsatisfactory in the promotion of the crystallization of the polyester resin. Usually, the crystal nucleating agent is used in an amount as described in Japanese Patent Examined Publication (Kokoku) Nos. 44-7542, 45-26222, 45-26225, 46-7180, 46-29957, 47-3025, 47-13137, 47-14502, 47-25850, 47-27142, 47-27780, 47-32435, 48-4097, 48-4098, and 48-12861, depending upon the type of the crystal nucleating agent.

The polyester resin composition of the present invention may contain an additive consisting of at least one phosphorus compound selected from those of the formulae (II) and (III):

(II)

and

(III)

wherein X, Y and Z respectively represent, independently from each other, a member selected from the group consisting of a hydrogen atom, monovalent hydrocarbon radicals, and radicals of the formula —OR$^3$ in which R$^3$ represents a member selected from a hydrogen atom and monovalent hydrocarbon radicals.

The monovalent hydrocarbon radicals represented by X, Y, Z and R$^3$ independently from each other, in the formulae (II) and (III), are selected from substituted and unsubstituted alkyl, aralkyl and aryl radicals each having 12 carbon atoms or less. The alkyl radicals include methyl, ethyl, n-propyl, isopropyl, butyl, pentyl, hexyl, cyclohexyl, octyl and decyl radicals. The aryl radicals include phenyl, napthyl, methyl phenyl, phenylphenyl and bromated phenyl radicals. The aralkyl radicals include a benzyl radical.

The examples of the phosphorus compounds of the formulae (II) and (III) include phosphoric esters, such as phosphoric acid, trimethyl phosphate, methyldiethyl phosphate, triethyl phosphate, triisopropyl phosphate, tributyl phosphate, and triphenyl phosphate; phosphorous esters, such as phosphorous acid, trimethyl phosphite, triethyl phosphite and triphenyl phosphite; phosphonic compounds, such as, phosphonic acid, phenylphosphonic acid and phenyl phenylphosphonate; and phosphinic compounds, such as phosphinic acid, phenylphosphinic acid and dimethylphosphinic acid. In the above-mentioned compounds, preferable ones are trimethyl phosphate and phosphorous esters, such as triphenyl phosphite.

The phosphorus compounds can be used singly or in combination of two or more thereof.

The phosphorus compounds of the formulae (II) and (III) are effective for enhancing the heat resistance of the resultant polyester resin composition. The phosphorus compounds are used in an amount of 2 parts by weight or less, preferably, from 0.01 to 2 parts by weight of the polyester resin. An excessive amount over 2 parts by weight of the phosphorus compounds is not only not effective for increasing the heat resistance of the resultant polyester resin composition, but, also, causes the resultant molded product to exhibit a reduced mechanical strength.

The polyester resin composition of the present invention may contain, in addition to the above-mentioned phosphorus compounds of the formulae (II) and (III), a further additive consisting of at least one epoxy compound selected from those of the formula (IV):

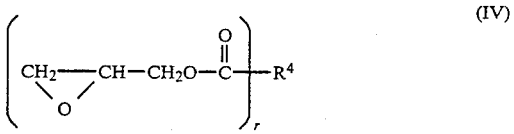

(IV)

wherein r represents an integer of 2 or more and R$^4$ represents a r-valent hydrocarbon radical, and when r is 2, R$^4$ may be a radical of the formula

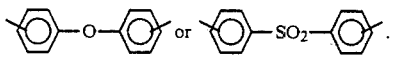

The epoxy compounds of the formula (IV) are a certain type of 2,3-epoxypropanol esters of polyfunctional carboxylic acids.

In the formula (IV), the hydrocarbon radicals represented by R$^4$ include aliphatic hydrocarbon radicals having 16 carbon atoms, such as methylene, ethylene trimethylene, tetramethylene, peutamethylene, hexamethylene, heptamethylene, octamethylene, and nonamethylene; cycloaliphatic hydrocarbon radicals, such as cyclophexylene; and aromatic hydrocarbon radicals, such as phenylene, naphthylene, methylphenylene and radicals of the formulae:

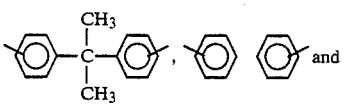

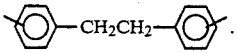

When r is 2, R$^4$ may be a divalent radical of the formula:

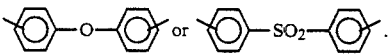

In the formula (IV), r is an integer of 2 or more, preferably, from 2 to 6, still more preferably, 2.

The examples of the epoxy compounds of the formula (IV) are di-2,3-epoxypropanol ester of terephthalic acid, di-2,3-epoxypropanol ester of isophthalic acid, di-2,3-epoxypropanol ester of phthalic acid, tri-2,3-epoxypropanol ester of trimellitic acid, tetra-2,3-epoxypropanol ester of pyromellitic acid, di-2,3-epoxypropanol ester of diphenyl dicarboxylic acid, di-2,3-epoxypropanol ester of adipic acid, di-2,3-epoxypropanol ester of succinic acid, di-2,3-epoxypropnaol ester of dodecane dicarboxylic acid, di-2,3-epoxypropanol ester of cyclonexane dicarboxylic acid, di-2,3-epoxypropanol ester of naphthalene dicarboxylic acid and di-2,3-epoxypropanol ester of methyl terephthalic acid.

The epoxy compounds of the formula (IV) may be used singly or in combination of two or more thereof. The epoxy compound may contain a small amount of oligomers thereof which are by-products in the preparation thereof.

The epoxy compounds of the formula (IV) are used in an amount of 3 parts by weight or less, preferably, from 0.05 to 3 parts by weight, per 100 parts by weight of the polyester resin.

An excessive amount over 3 parts by weight of the epoxy compounds of the formula (IV) results in a reduced mobility of the resultant polyester resin composition. The reduced mobility causes difficulty in the molding procedure for a molded product having a complicated shape. Therefore, the polyester resin composition containing more than 3 parts by weight of the epoxy compound is useless for the production of molded products.

The polyester resin composition of the present invention may contain other additives which are usually used for conventional polyester resin compositions. That is, the additives include flame-retardants, antioxidants and heat-stabilizers. The flame retardant may comprise at least one member selected from halogenated organic compounds, for example, decabromobiphenyl ether, octabromobiphenyl ether, hexabromobiphenyl ether, halogenated polycarbonate oligomers, for example, polycarbonate oligomers produced from bromated bisphenol A, and halogenated epoxy compounds; phosphorus; phosphorus compounds; and phosphorus-nitrogen compounds, such as phosphonic amide.

The flame retardant may contain a flame retardant auxiliary, for example, antimony trioxide or zinc borate.

The antioxidant may comprise at least one member selected from hindered phenol compounds and sulfur compounds.

The heat stabilizer may comprise other phosphorous compounds than those of the formulae (II) and (III).

The polyester resin composition of the present invention may further contain still other additives, for examples, epoxy compounds other than the above-mentioned epoxy compounds, effective for stabilizing the viscosity of the composition and for enhancing resistance of the composition to hydrolysis. The epoxy compounds may be bisphenol A type epoxy compounds which have been prepared by reacting bisphenol A with epichlorophydrin; aliphatic glycidyl ether compounds which have been prepared by the reaction of various glycol or glycerol compounds with epichlorohydrin; novolak type epoxy compounds which have been produced by the reaction of novolak resins with epichlorohydrin; or cycloaliphatic epoxy compounds obtained from cycloaliphatic compounds.

Furthermore, the polyester resin composition of the present invention may contain still other additives, such as ultraviolet absorbers, coloring agents, lubricants, antistatic agents and blowing agents.

Still furthermore, the polyester resin composition of the present invention may contain a small amount of a thermoplastic resin other than the specific polyester resin of the present invention and/or a thermosetting resin. The other thermoplastic resin may comprise at least one member selected from styrol resins, acrylic resins, polyethylene resins, polypropylene resins, fluorine-containing polymer resins, polyamide resins, polycarbonate resins, polysulfone resins and soft thermoplastic resins, for example, ethylene-vinyl acetate copolymers and polyester elastomers.

The thermosetting resin may comprise at least one member selected from phenol resins, melamine resins, unsaturated polyester resins, and silicone resins.

The polyester resin composition of the present invention can be prepared by a conventional blending procedure of the polyester resin, polycaprolactone and, optionally, one or more additives. Usually, it is desirable that the above-mentioned components are uniformly dispersed in each other. For example, entire amounts of the components are mixed and homogenized in a mixing apparatus, such as a blender, kneader, mixing rolls or extruder, in a single procedure. In another procedure, the components are separately homogenized and then the homogenized components are mixed with each other and homogenized by using the mixing apparatus. In still another procedure, two or more of the components are pre-mixed with each other and then, the remaining components, which may be premixed with each other, are admixed to the pre-mixture and the resultant admixture is homogenized by using the above-mentioned mixing apparatus.

It is preferable that the polycaprolactone is uniformly kneaded into the body of the polyester resin. That is, it is preferable that a mixture of the polycaprolactone and the polyester resin are melted at an elevated temperature and the melt is homogenized.

In a usual procedure, the components in the form of powder, particles or grains are dry-blended to each other; the resultant dry blend is melt-mixed and homogenized by using an extruder; the homogenized melt is extruded in the form of a strand; and, then, the strand is cut into a desired length to provide pellets or grains of the resultant composition.

The resultant pellets are fed into a hopper of a molding apparatus while the pellets are maintained in a dry condition, and then, the dry pellets are subjected to a molding procedure.

In another usual procedure, before, during or after the polyester resin is prepared by a polycondensing process, the other components, excluding polycaprolactone, are added to the polycondensing mixture. After the production of the polyester resin composition is completed, polycaprolactone is added to the polyester resin composition.

In the case where glass fibers are mixed, as a filler, to the polyester resin composition, it is desirable to prevent breakage of the glass fibers during the blending procedure so as improve the processability of the blend. Accordingly, the glass fibers are preferably mixed with the other components in a dry mixing apparatus, except for the extruder or kneader. For example, the polyester resin pellets are mixed with glass chopped strands or a pre-mixture of the polyester resin with a large amount of the glass chopped strands; the mixture is fed into a hopper for a molding apparatus; and, then, subjected to the molding procedure.

The polyester resin composition of the present invention is easily molded by using a conventional molding method and apparatus. Since the polyester resin composition exhibits a highly enhanced crystallizing property and mobility, the molding procedure of the polyester resin composition can be effected at a wide range of mold temperatures without difficulty. The resultant molded product exhibits an excellent dimensional stability, a superior toughness and a satisfactory appearance.

The following specific examples are presented for the purpose of clarifying the present invention. However, it should be understood that these are intended only to be examples of the present invention and are not intended to limit the present invention in any way.

In the examples, the intrinsic viscosity of the polyester resin was determined in ortho-chlorophenol at a temperature of 35° C., and the properties of the molded products are determined as follows.

(1) Deflection temperature

This was determined in accordance with the method of ASTM D648 under a load of 264 psi.

(2) Static strength

A. Tensile strength was determined in accordance with the method of ASTM D638.

B. Flexural strength was determined in accordance with the method of ASTM D790.

C. Impact strength was determined in accordance with the method of ASTM D-256 in which an Izod notch having a thickness of $\frac{1}{8}$ inch was used.

(3) Mobility of melt

This was determined in accordance with the method of JISK-7210 in which the testing load was 100 kgf, the diameter of the die was 1 mm and the length of the die was 10 mm.

(4) Shrinkage

Two or more flat plates were produced by an injection molding procedure using a flat plate mold having an inside length of 110 mm, an inside width of 110 mm and an inside depth of 2 mm. One of the resultant molded plates was conditioned at a temperature of 25° C. for 48 hours. This plate was referred to as a conditioned plate. The dimensions of the conditioned plate were measured. Also, another molded plate was annealed at a temperature of 130° C. for 2 hours and, then, conditioned at 25° C. for 48 hours. This plate was referred to as an annealed plate. The dimensions of the annealed plate were measured.

The molding shrinkage factor (%) and the heat shrinkage factor of the molded plate were calculated in accordance with the following equations.

Molding shrinkage factor (%) =

$$\frac{110 - (\text{dimension in mm of conditioned plate})}{110} \times 100$$

Heat shrinkage factor (%) =

$$\frac{(\text{dimension in mm of condition plate}) - (\text{dimension in mm of annealed plate})}{(\text{dimension in mm of conditioned plate})} \times 100$$

EXAMPLES 1 THROUGH 5 AND COMPARATIVE EXAMPLES 1 THROUGH 3

In each of the Examples 1 through 5 and Comparative Examples 1 through 3, pellets of a polyethylene terephthalate having an intrinsic viscosity of 0.65 were dried at a temperature of 130° C. for 5 hours and then, uniformly mixed with the amounts indicated in Table 1 of glass chopped strands having a length of 3 mm, of a powder of a terminal-modified polycaprolactone having a number average molecular weight of 1590, and of a type indicated in Table 1 of a crystal nucleating agent, by using a V type blender.

The mixture was fed into an extruder having a cylinder diameter of 65 mm, melt-kneaded at a barrel temperature of 270° C. and extruded through a die. The extruded strand of the mixture was solidified by cooling and the solidified strand was cut into a length of 3 mm to provide molding pellets. The resultant pellets were dried at a temperature 130° C. for 5 hours. The dried pellets were subjected to a molding procedure to provide test specimens of the polyester resin composition. The molding procedure was carried out by using an injection-molding machine having a capacity of 5 ounces (141.5 g) and equipped with a testing mold. In the molding procedure, the temperature of the cylinder was 270° C., the temperature of the mold was 85° C., the injection pressure was 800 kg/cm$^2$, the cooling time period was 20 seconds, and the time period of one cycle of the injecting and cooling operations was 35 seconds.

The terminal-modified polycaprolactone was produced in the following manner.

A mixture of 100 parts by weight of e-caprolactone with 4.31 parts by weight of a polymerization initiator consisting of ethylene glycol and 0.09 parts by weight of tin octylate, was stirred at a temperature of 180° C. for 6 hours. The resultant reaction product comprising polycaprolactone was mixed with 28.4 parts by weight of acetic anhydride. The mixture was heated at a temperature of 130° C. for 2 hours while being stirred and while the produced acetic acid was eliminated from the reaction mixture. Thereafter, the remaining amount of acetic anhydride was eliminated under a reduced pressure. The resultant terminal-modified polycaprolactone had a hydroxyl value of 2 or less, determined in accordance with the method of Japanese Industrial Standard (JIS) K-1557.

The ionic copolymer used as a crystal nucleating agent was prepared from 90 parts by weight of ethylene and 10 parts by weight of methacrylic acid and the carboxylic radicals in the copolymer molecules were completely converted into the form of sodium salt. The ionic copolymer had a melt index of 5.8 g/10 minutes or less, determined in accordance with ASTM D1238-57T, and a size of from 300 to 500 microns.

The sodium montanate, used as a crystal nucleating agent, was comprised mainly of partial sodium sults of a mixture of aliphatic monocarboxylic acids having 22 to 32 carbon atoms.

The resultant molded test specimens of the polyester resin composition exhibited the properties indicated in Table 1.

TABLE 1

| | Composition (part by weight) | | |
|---|---|---|---|
| | Polyethylene | Terminal-modified | Crystal nucleating agent |

TABLE 1-continued

| Example No. | terephthalate | Glass fiber | polycaprolactone | type | Amount |
|---|---|---|---|---|---|
| Comparative Example | | | | | |
| 1 | 100 | 0 | 0 | None | — |
| 2 | 70 | 30 | 0 | None | — |
| 3 | 69.7 | " | 0 | Sodium palmitate | 0.3 |
| Example | | | | | |
| 1 | 65.7 | " | 4 | " | " |
| 2 | 63.8 | " | 6 | Sodium benzoate | 0.2 |
| 3 | 66.5 | " | 3 | Calcium stearate | 0.5 |
| 4 | 67.7 | " | 2 | Sodium montanate | 0.3 |
| 5 | 64.0 | " | 4 | Ionic copolymer | 2 |

| | Property of molded product | | | | | | |
|---|---|---|---|---|---|---|---|
| Example No. | Deflection temperature (°C.) | Molding shrinkage (%) | Heat shrinkage (%) | Appearance | Tensile strength (Kg/cm$^2$) | Flexural strength (Kg/cm$^2$) | Flexural elasticity (Kg/cm$^2$) |
| Comparative Example | | | | | | | |
| 1 | 70 | 0.4 | 1.6 | Unsatisfactory | 600 | 1000 | 36,000 |
| 2 | 72 | 0.5 | 1.6 | Unsatisfactory | 1540 | 2210 | 100,000 |
| 3 | 73 | 0.4 | 1.6 | Unsatisfactory | 1530 | 2190 | 99,000 |
| Example | | | | | | | |
| 1 | 218 | 1.4 | 0.10 | Satisfactory | 1560 | 2220 | 94,000 |
| 2 | 212 | 1.3 | 0.09 | " | 1540 | 2190 | 88,000 |
| 3 | 217 | 1.4 | 0.13 | " | 1590 | 2260 | 96,000 |
| 4 | 208 | 1.2 | 0.13 | " | 1580 | 2210 | 97,000 |
| 5 | 206 | 1.2 | 0.10 | " | 1490 | 2160 | 88,000 |

Table 1 shows that the absence of the terminal-modified polycaprolactone results in a poor crystallinity, a low deflection temperature and a large heat shrinkage of the resultant molded product. However, the polyester resin compositions containing the terminal-modified polycaprolactone exhibited a satisfactorily enhanced crystallizing property and the resultant molded product exhibited a high deflection temperature, a low heat shrinkage and a satisfactory appearance.

EXAMPLES 6 AND 7 AND COMPARATIVE EXAMPLES 4 AND 5

In each of the Examples 6 and 7 and Comparative Examples 4 and 5, the same procedures as those described in Example 1 were carried out with the following exception.

In the molding pellet preparation, polyethylene terephthalate pellets having an intrinsic viscosity of 0.70 and dried at a temperature of 140° C. for 4 hours, were used in the amounts indicated in Table 2. The type and amount of the terminal-modified polycaprolactone used were as indicated in Table 2. Referring to Table 2, type A of the terminal-modified polycaprolactone was prepared by reacting 100 parts by weight of a polycaprolactone having hydroxyl radicals as terminal groups thereof and a number average molecular weight of 550 with 100 parts by weight of methyl benzoate in the presence of 0.14 parts by weight of manganese acetate at a temperature of from 190° to 210° C. for 10 hours, while the reaction mixture was stirred and while the produced methyl alcohol was eliminated from the reaction mixture. Thereafter, the residual amount of methyl benzoate was eliminated from the reaction mixture under a reduced pressure. The resultant terminal-modified polycaprolactone had a number average molecular weight of 740 and a hydroxyl value of 2.0 or less.

Type B of the terminal-modified polycaprolactone was produced by reacting 100 parts by weight of a polycaprolactone having hydroxyl radicals as terminal groups thereof and a number average molecular weight of 50,000 with 30 parts by weight of methyl benzoate in the presence of 0.1 parts by weight of manganese acetate in the same manner as that described above. The resultant terminal-modified polycaprolactone had a number average molecular weight of about 50,000 and a hydroxyl value not exceeding 2.0.

The resultant molded products exhibited properties indicated in Table 2.

Table 2 indicates that in Comparative Example 4, the terminal-modified polycaprolactone having a large number average molecular weight of 50,000 did not promote the crystallization of the polyester resin and that in Comparative Example 5, an excessive amount of the terminal-modified polycaprolactone resulted not only in an unsatisfactory promotion of the crystallization of the polyester resin, but, also, in an unsatisfactory mechanical strength of the molded product. In Examples 6 and 7, however, the resultant compositions exhibited an enhanced crystallization of the polyester resin and the molded products exhibited an excellent dimensional stability at an elevated temperature and an excellent mechanical strength.

TABLE 2

| Example No. | Composition (part by weight) | | | | | Property of molded product | | | | | | |
|---|---|---|---|---|---|---|---|---|---|---|---|---|
| | Polyethylene terephthalate | Glass fiber | Terminal-modified polycaprolactone | | Talc | Deflection temperature (°C.) | Molding shrinkage (%) | Heat shrinkage (%) | Appearance | Tensile strength (Kg/cm²) | Flexural strength (Kg/cm²) | Flexural elasticity (Kg/cm²) |
| | | | Type | Amount | | | | | | | | |
| Example | | | | | | | | | | | | |
| 6 | 62 | 30 | A | 3 | 5 | 218 | 1.4 | 0.14 | Satisfactory | 1520 | 2130 | 103,000 |
| 7 | 60 | " | A | 5 | " | 208 | 1.6 | 0.12 | " | 1460 | 2110 | 97,000 |
| Comparative Example | | | | | | | | | | | | |
| 4 | 62 | " | B | 5 | " | 78 | 0.6 | 1.10 | Unsatisfactory | 1470 | 2140 | 98,000 |
| 5 | 49 | " | A | 16 | " | 142 | 1.4 | 0.11 | " | 910 | 1280 | 81,000 |

EXAMPLE 8

The same procedures as those described in Example 1 were carried out, except that the molding pellets were prepared from 64 parts by weight of polyethylene terephthalate pellets having an intrinsic viscosity of 0.64 and dried with hot air at a temperature of 130° C. for 5 hours; 10 parts by weight of glass chopped strands having a length of 3 mm; 20 parts by weight of a crystal nucleating agent consisting of talc; and 1 part by weight of a terminal-modified polycaprolactone.

The terminal-modified polycaprolactone used herein was prepared by reacting 100 parts by weight of a polycaprolactone having a number average molecular weight of 850 and a hydroxyl value of 136 with 99.6 parts by weight of methyl benzoate in the presence of 0.09 parts by weight of manganese acetate, in the same manner as that described in Example 6. The resultant terminal-modified polycaprolactone had a hydroxyl value of about 5.0 and a number average molecular weight of about 990.

The resultant molded product had a glossy surface thereof, a satisfactory appearance and the following satisfactory properties.
Deflection temperature: 194° C.
Molding shrinkage: 0.9%
Heat shrinkage: 0.1%
Tensile strength: 1120 kg/cm²
Flexural strength: 1490 kg/cm²

EXAMPLE 9

The same procedures as those described in Example 1 were carried out except that the molding pellets were prepared from 65 parts by weight of polyethylene terephthalate pellets having an intrinsic viscosity of 0.64 and dried with hot air at a temperature of 140° C. for 4 hours; 10 parts by weight of glass chopped strands having a length of 3 mm; 5 parts by weight of talc; 30 parts by weight of glass flakes having an average mesh size of 300; and 4 parts by weight of a terminal-modified polycaprolactone having a number average molecular weight of about 860 and a hydroxy value of 11.

The terminal-modified polycaprolactone was prepared by reacting 100 parts by weight of a polycaprolactone having a number average molecular weight of 550 and a hydroxyl value of 305 with 148 parts by weight of methyl benzoate in the presence of 0.19 parts by weight of manganese acetate, in the same manner as that described in Example 6.

The resultant molded product exhibited a glossy surface thereof and a satisfactory appearance thereof and exhibited the following properties.
Deflection temperature: 206° C.
Molding shrinkage: 1.2%
Heat shrinkage: 0.1%
Tensile strength: 1240 kg/cm²
Flexural strength: 1810 kg/cm²

EXAMPLES 10 THROUGH 13 AND COMPARATIVE EXAMPLE 6

In each of Examples 10 through 13 and Comparative Example 6, the same procedures as those described in Example 1 were carried out, except that the molding pellets contained, in addition to the polyethylene terephthalate, the glass chopped strands, and the terminal-modified polycaprolactone, a crystal nucleating agent in the type and amount indicated in Table 3 and triphenylphosphate in the amount indicated in Table 5.

The properties of the resultant molded products are indicated in Table 5.

The ionic copolymer used was the same as that described in Example 5.

TABLE 3

| Example No. | Composition (part by weight) | | | | | | Property of molded product | | | | | |
|---|---|---|---|---|---|---|---|---|---|---|---|---|
| | Polyethylene terephthalate | Glass fiber | Terminal-modified polycaprolactone | Crystal nucleating agent | | Triphenyl phosphate | Deflection temperature (°C.) | Molding shrinkage (%) | Heat shrinkage (%) | Appearance | Tensile strength (Kg/cm²) | Flexural strength (Kg/cm²) |
| | | | | Type | Amount | | | | | | | |
| Comparative Example | | | | | | | | | | | | |
| 6 | 69.3 | 30 | 0 | Sodium palmitate | 0.3 | 0.4 | 70 | 0.4 | 1.5 | Unsatisfactory | 1510 | 2170 |
| Example | | | | | | | | | | | | |
| 10 | 65.3 | " | 4 | Sodium palmitate | 0.3 | 0.4 | 217 | 1.4 | 0.09 | Satisfactory | 1540 | 2200 |
| 11 | 64.6 | " | 5 | Sodium benzoate | 0.2 | 0.2 | 210 | 1.4 | 0.10 | " | 1530 | 2190 |
| 12 | 66.2 | " | 3 | Calcium stearate | 0.5 | 0.3 | 209 | 1.2 | 0.13 | " | 1570 | 2250 |

TABLE 3-continued

| Example No. | Composition (part by weight) | | | | | Property of molded product | | | | | |
|---|---|---|---|---|---|---|---|---|---|---|---|
| | Polyethylene terephthalate | Glass fiber | Terminal-modified polycaprolactone | Crystal nucleating agent | | Triphenyl phosphate | Deflection temperature (°C.) | Molding shrinkage (%) | Heat shrinkage (%) | Appearance | Tensile strength (Kg/cm²) | Flexural strength (Kg/cm²) |
| | | | | Type | Amount | | | | | | | |
| 13 | 63.8 | " | 4 | Ionic copolymer | 2 | 0.2 | 206 | 1.2 | 0.10 | " | 1480 | 2150 |

EXAMPLES 14 THROUGH 17 AND COMPARATIVE EXAMPLES 7 AND 8

In each of Examples 14 through 17 and Comparative Examples 7 and 8, the same procedures as those described in Example 3 were carried out, except that in the preparation of the molding pellets, the polyethylene terephthalate resin was used in an amount indicated in Table 4, the type indicated in Table 4 of terminal-modified polycaprolactone was used in an amount indicated in Table 4 and triphenyl phosphate was used as an additional additive in an amount indicated in Table 4.

The types A and B of the terminal-modified polycaprolactones were the same as those described in Example 6 and Comparative Example 4.

The type C of the terminal-modified polycaprolactone was prepared by reacting 100 parts by weight of a polycaprolactone having a number average molecular weight of 1200 and a hydroxyl value of 93 with 80 parts by weight of methyl benzoate in the presence of 0.2 parts by weight of manganese acetate, in the same manner as that described in Example 6. The resultant modification had a number average molecular weight of about 1405 and a hydroxyl value of 2.0 or less.

The resultant molded products had properties indicated in Table 4.

modified polycaprolactone was prepared in the following manner.

A reaction mixture of 100 parts by weight of a polycaprolactone having a number average molecular weight of 820 and a hydroxyl value of 136 with 120 parts by weight of methyl paratoluate and 0.18 parts by weight of manganese acetate was agitated at a temperature of from 190° to 210° C. for 10 hours while the resultant methyl alcohol was eliminated from the reaction mixture. Thereafter, the residual amount of methyl paratoluate was eliminated from the reaction product under a reduced pressure. The resultant modification had a number average molecular weight of about 1020 and a hydroxyl value of 5.

The molded product exhibited a satisfactory glossy appearance and had the following properties.
Deflection temperature: 198° C.
Molding shrinkage: 0.9%
Heat shrinkage: 0.1%
Tensile strength: 1130 kg/cm²
Flexural strength: 1520 kg/cm²

EXAMPLE 19

The same procedures as those described in Example 9 were carried out, except that the molding pellets contained 0.5 parts by weight of an additional additive

TABLE 4

| Example No. | Composition (part by weight) | | | | | | Property of molded product | | | | | |
|---|---|---|---|---|---|---|---|---|---|---|---|---|
| | Polyethylene terephthalate | Glass fiber | Terminal-modified polycaprolactone | | Talc | Triphenyl phosphate | Deflection temperature (°C.) | Molding shrinkage (%) | Heat shrinkage (%) | Appearance | Tensile strength (Kg/cm²) | Flexural strength (Kg/cm²) |
| | | | Type | Amount | | | | | | | | |
| Example 14 | 61 | 30 | A | 3 | 5 | 1 | 216 | 1.4 | 0.14 | Satisfactory | 1510 | 2110 |
| 15 | 59 | " | A | 5 | " | " | 210 | 1.7 | 0.10 | " | 1490 (1420)(*) | 2160 (2070)(*) |
| 16 | 59 | " | C | " | " | " | 211 | 1.5 | 0.11 | " | 1460 | 2070 |
| Comparative Example 7 | 59 | " | B | " | " | " | 76 | 0.5 | 1.10 | Unsatisfactory | 1460 | 2100 |
| 8 | 48 | " | A | 16 | " | " | 141 | 1.4 | 0.10 | Unsatisfactory | 890 | 1250 |
| Example 17 | 60 | " | A | 5 | " | 0 | 208 | 1.6 | 0.12 | Satisfactory | 1460 (1020)(*) | 2110 (1370)(*) |

Note:
(1*) - The parenthesized flexural strength values were of the molded products prepared at a cylinder temperature of 290° C. in the extruder in the molding procedure.

Table 4, especially, Example 15, shows that the triphenyl phosphate is effective for producing the molded product at a relatively high molding temperature of 290° C. substantially without decreasing the mechanical strength of the molded product.

EXAMPLE 18

The same procedures as those described in Example 8 were carried out, except that the molding pellets contained 0.5 parts by weight of an additional additive consisting of triphenylphosphite, and the terminal-consisting of trimethyl phosphate.

The molded product exhibited a satisfactory glossy appearance and had the following properties.
Deflection temperature: 208° C.
Molding shrinkage: 1.3%
Heat shrinkage: 0.1%
Tensile strength: 1220 kg/cm²
Flexural strength: 1820 kg/cm²

EXAMPLES 20 THROUGH 25

In each of the Examples 20 through 25, the same procedures as those described in Example 14 were carried out, except that the polyethylene terephthalate resin was used in an amount of 61.5 parts by weight, and 0.5 parts by weight of a type of phosphorus compound indicated in Table 5 was used in place of triphenylphosphate.

The properties of the resultant molded products are indicated in Table 5.

In the comparison of the results of Example 26 through 28 with those of Comparative Examples 9 through 11, it is clear that the absence of the terminal-modified polycaprolactone resulted in a low deflection temperature and in a large heat shrinkage due to the poor crystallization of the polyester resin. This phenomenon is variable, depending on the content of the polyethylene terephthalate in the polyester resin composition. That is, the higher the content of polyethylene terephthalate, the poorer the degree of crystallization of the polyester resin.

TABLE 5

| Example No. | Phosphorus compound | Deflection temperature (°C.) | Molding shrinkage (%) | Heat shrinkage (%) | Appearance | Tensile strength (Kg/cm$^2$) | Flexural strength (Kg/cm$^2$) |
|---|---|---|---|---|---|---|---|
| 20 | Phosphoric acid | 213 | 1.5 | 0.10 | Satisfactory | 1520 | 2240 |
| 21 | Phosphorous acid | 210 | 1.4 | 0.11 | " | 1530 | 2230 |
| 22 | Phosphonic acid | 212 | 1.4 | 0.12 | " | 1510 | 2220 |
| 23 | Phosphinic acid | 213 | 1.6 | 0.13 | " | 1520 | 2230 |
| 24 | Dimethyl phosphinic acid | 212 | 1.5 | 0.12 | " | 1530 | 2240 |
| 25 | Phenyl phosphonic acid | 214 | 1.5 | 0.13 | " | 1520 | 2230 |

EXAMPLES 26 THROUGH 31 AND COMPARATIVE EXAMPLES 9 THROUGH 12

In each of the Examples 26 through 31 and Comparative Examples 9 through 12, the same procedures as those described in Example 1 were carried out, except for the following items.

1. The molding pellets were produced from a polyester resin composed of a mixture of a polyethylene terephthalate having an intrinsic viscosity of 0.65 and a polybutylene terephthalate having an intrinsic viscosity of 0.85, each being in the amounts indicated in Table 6 and each having been dried at a temperature of 130° C. for 5 hours; the amount indicated in Table 6 of glass chopped strands; the amount indicated in Table 6 of a terminal-modified polycaprolactone having a number average molecular weight of 740 which was prepared using the same procedures as those mentioned in Example 6; and the amount indicated in Table 6 of talc.

2. In the molding procedure, the temperature of the mold was 70° C.

The properties of the resultant molded products are indicated in Table 6.

From the comparison of Example 31 with Comparative Exaple 12, it is evident that even when no glass fiber was used, the presence of the terminal-modified polycaprolactone is effective for reducing the heat shrinkage and for improving the appearance of the molded product.

EXAMPLES 32 AND 33 AND COMPARATIVE EXAMPLES 13 THROUGH 17

In each of Examples 32 and 33 and Comparative Examples 13 through 17, the same procedures as those described in Example 26 were carried out, except for the following items.

1. The polyester resin was replaced by a blend resin consisting of 40 parts by weight of a plybutylene terephthalate having an intrinsic viscosity of 1.05 and 50 parts by weight of a polymer resin indicated in Table 7.

2. No glass fiber was used.

3. The blending operation was carried out by using a Henshel mixer.

The molding shrinkage and apparatus of each molded product are indicated in Table 7.

TABLE 6

| | Composition (part by weight) | | | | | Property of molded product | | | | | |
|---|---|---|---|---|---|---|---|---|---|---|---|
| Example No. | Polyethylene terephthalate | Polybutylene terephthalate | Glass fiber | Terminal-modified polycaprolactone | Talc | Deflection temperature (°C.) | Molding shrinkage (%) | Heat shrinkage (%) | Appearance | Tensile strength (Kg/cm$^2$) | Flexural strength (Kg/cm$^2$) |
| Example | | | | | | | | | | | |
| 20 | 50 | 10 | 30 | 5 | 5 | 217 | 1.4 | 0.10 | Highly glossy | 1520 | 2150 |
| 27 | 30 | 30 | " | " | " | 210 | 1.4 | 0.15 | " | 1480 | 2020 |
| 28 | 10 | 50 | " | " | " | 208 | 1.6 | 0.13 | " | 1400 | 1960 |
| 29 | 55 | 5 | " | 7 | " | 205 | 1.4 | 0.09 | " | 1510 | 2070 |
| 30 | 34 | 34 | 20 | 7 | " | 195 | 1.7 | 0.18 | " | 1270 | 1910 |
| 31 | 45 | 45 | 0 | 5 | " | 78 | 1.8 | 0.21 | " | 820 | 1220 |
| Comparative Example | | | | | | | | | | | |
| 9 | 50 | 10 | 30 | 0 | 10 | 93 | 0.4 | 1.4 | Extremely bad | 1460 | 2130 |
| 10 | 30 | 30 | " | 0 | " | 146 | 0.8 | 1.0 | Unsatisfactory | 1310 | 1970 |
| 11 | 10 | 50 | " | 0 | " | 192 | 1.9 | 0.48 | Highly glossy | 1230 | 1820 |
| 12 | 45 | 45 | 0 | 0 | " | 65 | 0.6 | 1.5 | Slightly glossy | 850 | 1240 |

TABLE 7

| Example No. | Blended polymer resin | Molding shrinkage (%) | Appearance |
|---|---|---|---|
| Example 32 | None | 1.93 | Satisfactory |
| Comparative Example | | | |
| 13 | Polyacetal | — | Not moldable |
| 14 | Nylon 6 | — | " |
| 15 | Nylon 66 | — | " |
| 16 | Polypropylene | 2.10 | Satisfactory, pearl-like gloss |
| 17 | Polyethylene produced by high pressure method | 2.15 | Satisfactory, pearl-like gloss |
| Example 33 | Polyethylene terephthalate having an intrinsic viscosity of 0.72 | 1.68 | Satisfactory |

Table 7 shows that polyacetal, nylon 6 and nylon 66 caused the resultant resin compositions to be not moldable and polypropylene and polyethylene caused the resultant molded products to exhibit a very large molding shrinkage and a pearl-like gloss.

EXAMPLES 34 THROUGH 37 AND COMPARATIVE EXAMPLE 18

In each of the Examples 34 through 37 and Comparative Example 18, the same procedures as those described in Example 26 were carried out, except for the following items.

1. The molding pellets were produced from a blend of the amount indicated in Table 8 of a polyethylene terephthalate having an intrinsic viscosity of 0.70 and the amount indicated in Table 8 of a polybutylene terephthalate having an intrinsic viscosity of 0.95, each polyester having been dried at a temperature of 140° C. for 4 hours; 30 parts by weight of glass chopped strands having a length of 3 mm; the amount indicated in Table 8 of a terminal-modified polycaprolactone having a number average molecular weight of 1590; the amount indicated in Table 8 of triphenylphosphate; and the amount and the type indicated in Table 8 of a crystal nucleating agent.

2. The terminal-modified polycaprolactone was produced by the same method as that described in Example 1.

3. The ionic copolymer used as a crystal nucleating agent was the same as that described in Example 5.

The properties of the resultant molded products are indicated in Table 8.

TABLE 8

| | Composition (part by weight) | | | | | | |
|---|---|---|---|---|---|---|---|
| Example No. | Polyethylene terephthalate | Polybutylene terephthalate | Glass fiber | Terminal-modified polycaprolactone | Triphenyl phosphate | Crystal nucleating agent Type | Amount |
| Example 34 | 44.3 | 21 | 30 | 4 | 0.4 | Sodium palmitate | 0.3 |
| 35 | 44.6 | 20 | " | 5 | 0.2 | Sodium benzoate | 0.2 |
| 36 | 46.2 | 20 | " | 3 | 0.3 | Calcium stearate | 0.5 |
| 37 | 43.8 | 20 | " | 4 | 0.2 | Ionic copolymer | 2 |
| Comparative Example 18 | 48.3 | 21 | " | 0 | 0.4 | Sodium palmitate | 0.3 |

| | Property of molded product | | | | | |
|---|---|---|---|---|---|---|
| Example No. | Deflection temperature (°C.) | Molding shrinkage (%) | Heat shrinkage (%) | Appearance | Tensile strength (Kg/cm²) | Flexural strength (Kg/cm²) |
| Example 34 | 211 | 1.6 | 0.09 | Satisfactory glossy | 1490 | 2130 |
| 35 | 203 | 1.6 | 0.10 | Satisfactory glossy | 1480 | 2120 |
| 36 | 202 | 1.4 | 0.12 | Satisfactory glossy | 1520 | 2180 |
| 37 | 205 | 1.4 | 0.10 | Satisfactory glossy | 1440 | 2090 |
| Comparative Example 18 | 70 | 0.5 | 1.6 | Unsatisfactory | 1460 | 2100 |

EXAMPLES 38 AND COMPARATIVE EXAMPLES 19 AND 20

In each of Example 38 and the Comparative Examples 19 and 20, the same procedures as those described in Example 34 were carried out, except for the following items.

1. The polyethylene terephthalate and the polybutylene terephthalate were used in amounts indicated in Table 9.
2. Talc was used as a crystal nucleating agent in an amount of 4 parts by weight.
3. The terminal-modified polycaprolactone used was of the type indicated in Table 9. The types B and C of the terminal-modified polycaprolactones were the same as that described in Comparative Example 4 and Example 16, respectively.
4. Phosphorous acid was used in an amount of one part by weight in place of the triphenyl phosphate.

The properties of the resultant molded products are indicated in Table 9.

TABLE 9

| | | Example No. | | |
|---|---|---|---|---|
| | | Example | Comparative Example | |
| Item | | 38 | 19 | 20 |
| Composition (part by weight) | Polyethylene terephthalate | 45 | 45 | 34 |
| | Polybutylene terephthalate | 15 | 15 | 15 |
| | Glass fiber | 30 | 30 | 30 |
| | Terminal-modified polycaprolactone Type | C | B | C |
| | Molecular weight | 1,405 | 50,000 | 1,405 |
| | Amount | 5 | 5 | 16 |
| | Talc | 4 | 4 | 4 |
| | Phosphorous acid | 1 | 1 | 1 |
| Property of molded product | Deflection temperature (°C.) | 209 | 73 | 137 |
| | Molding shrinkage (%) | 1.7 | 0.7 | 1.6 |
| | Heat shrinkage (%) | 0.11 | 1.10 | 0.10 |
| | Appearance | Satisfactory | Unsatisfactory | Unsatisfactory |
| | Tensile strength (Kg/cm$^2$) | 1420 | 1420 | 860 |
| | Flexural strength (Kg/cm$^2$) | 2010 | 2040 | 1210 |

EXAMPLE 39

The same procedures as those described in Example 18 were carried out, except for the following items.
1. The polyester resin was composed of 45 parts by weight of a polyethylene terephthalate resin having an intrinsic viscosity of 0.64 and 19 parts by weight of a polybutylene terephthalate resin having an intrinsic viscosity of 0.95, both resins having been dried at a temperature of 130° C. for 5 hours.
2. Phosphoric acid was used in an amount of 0.5 parts in place of triphenyl phosphite.
3. The same terminal-modified polycaprolactone as that described in Example 18 was used in an amount of 2 parts by weight.

The resultant molded product exhibited a glossy appearance and the following properties.
Deflection temperature: 195° C.
Molding shrinkage: 0.9%
Heat shrinkage: 0.1%
Tensile strength: 1100 kg/cm$^2$
Flexural strength: 1470 kg/cm$^2$

EXAMPLE 40

The same procedures as those described in Example 19 were carried out, except that the polyester resin was composed of 46 parts by weight of a polyethylene terephthalate having an intrinsic viscosity of 0.65 and 19 parts by weight of a polybutylene terephthalate having an intrinsic viscosity of 0.95.

The resultant molded product exhibited a glossy appearance and the following properties.
Deflection temperature: 204° C.
Molding shrinkage: 1.4%
Heat shrinkage: 0.1%
Tensile strength: 1180 kg/cm2
Flexural strength: 1790 kg/cm2

REFERENTIAL EXAMPLE 1

Preparation of bis-2,3-epoxypropanol terephthalic ester, which will be referred to as DGT hereinafter A reaction of 3325 g (2 moles) of terephthalic acid with 3700 g (40 moles) of epichlorohydrin was carried out in the presence of 10 g of triethyl amine at a temperature of 90° C. for 4 hours. Next, 400 g (4 moles) of an aqueous solution of 50% by weight of sodium hydroxide were added dropwise to the reaction product over 4 hours, while the reaction mixture was vigorously stirred. After the adding operation was completed, the reaction mixture was additionally stirred for 0.5 hours. The reaction mixture was washed with water and, then, the residual amount of epichlorohydrin was removed from the reaction mixture under a reduced pressure. The residue was recrystallized by using toluene. The resultant bis-2,3-epoxypropanol terephthalic ester had an epoxy equivalent of 144 which corresponded to a degree of purity of 99% thereof, and a velting point of 108° C. The yield of bis-2,3-epoxypropanol terephthalic ester was 57%.

REFERENTIAL EXAMPLE 2

Preparation of bis-2,3-epoxid propanol-cyclohexane-1,4-dicarboxylic ester which will be referred to as DGH, hereinafter A reaction mixture of 86.1 g (0.5 moles) of cyclohexane-1,4-dicarboxylic acid, 924 g (10 moles) of epichlorohydrin and 1.72 g of benzyl-trimethyl ammonium chloride was heated to a temperature of 100° C. to homogenize it. Thereafter, the homogenized reaction mixture was kept at a temperature of 85° C. for 3 hours to effect the reaction of cyclohexane dicarboxylic acid with epichlorohydrin. While the reaction mixture was vigorously agitated at a temperature of approximately 40° C., 100 g of an aqueous solution of 50% by weight of sodium hydroxide were added dropwise to the reaction mixture. After the adding operation was completed, the agitating operation on the reaction mixture was continued for 0.5 hours.

The non-reacted epichlorohydrin was removed from the reaction product under a reduced pressure. The residual reaction product was mixed with about 1000 g benzene and, then, washed once with an aqueous solution of 10% by weight of sodium hydroxide and, then, twice with water. The washed reaction product was filtered and thereafter, benzene was removed therefrom under a reduced pressure.

In order to completely remove the residual amount of epichlorohydrin, a small amount of toluene was mixed with the reaction product and, then, epichlorohydrin and toluene were concurrently separated from the reaction product by means of azeotropic distillation.

The resultant bis -2,-epoxid propanol cyclohexane-1,4-dicarboxylic ester was obtained in an amount of 127 g which corresponded to a yield of 88% and exhibited an epoxy equivalent of 154 which corresponded to a degree of purity of 94% thereof, and a melting point of from 35° to 90° C.

4. Trimethyl phosphate was used in an amount indicated in Table 10 as an additional additive.

5. An epoxy compound DGT was used in an amount indicated in Table 10 as a further additional additive.

6. The ionic copolymer used in Example 44 was the same as that used in Example 5.

7. In the molding procedure, the temperature of the mold was 80° C. and the injection pressure was 700 kg/cm$^2$.

The properties of the resultant molded products are indicated in Table 10.

TABLE 10

| | | Composition (part by weight) | | | | | |
|---|---|---|---|---|---|---|---|
| Example No. | Polyethylene terephthalate | Glass fiber | Terminal-modified polycaprolactone | Crystal nucleating agent | | Trimethyl phosphate | Epoxy compound DGT |
| | | | | Type | Amount | | |
| Comparative Example 21 | 68.8 | 30 | 0 | Sodium palmitate | 0.3 | 0.4 | 0.5 |
| Example 41 | 64.8 | 30 | 4 | Sodium palmitate | " | " | " |
| 42 | 64.3 | 30 | 5 | Sodium benzoate | 0.2 | 0.8 | 0.3 |
| 43 | 65.5 | 30 | 3 | Calcium stearate | 0.5 | 0.3 | 0.7 |
| 44 | 63.6 | 30 | 4 | Ionic copolymer | 2 | 0.2 | 0.2 |

| | Property of molded product | | | | | |
|---|---|---|---|---|---|---|
| Example No. | Deflection temperature (°C.) | Molding shrinkage (%) | Heat shrinkage (%) | Appearance | Tensile strength (Kg/cm$^2$) | Flexural strength (Kg/cm$^2$) |
| Comparative Example 21 | 70 | 0.4 | 1.5 | Unsatisfactory | 1520 | 2200 |
| Example 41 | 216 | 1.4 | 0.10 | Satisfactory | 1560 | 2210 |
| 42 | 208 | 1.4 | 0.11 | " | 1550 | 2200 |
| 43 | 209 | 1.3 | 0.12 | " | 1600 | 2260 |
| 44 | 203 | 1.0 | 0.13 | " | 1510 | 2170 |

EXAMPLES 41 THROUGH 44 AND COMPARATIVE EXAMPLE 21

In each of the Examples 41 through 44 and Comparative Example 21, the same procedures as these described in Example 1 were carried out except for the following items.

1. The polyethylene terephthalate resin was used in an amount indicated in Table 10.

2. The terminal-modified polycaprolactone had a hydroxy value of 1.7 and was used in an amount indicated in Table 10.

3. The type indicated in Table 10 of a crystal nucleating agent was used in an amount indicated in Table 10.

EXAMPLES 45 AND 46 AND COMPARATIVE EXAMPLES 22 AND 23

In each of the Examples 45 and 46 and Comparative Examples 22 and 23, the same procedures as those described in Example 14 were carried out, except that the molding pellets had the composition indicated in Table 11.

The terminal-modified polycaprolactone D used in Example 46 was prepared by using 100 parts by weight of polycaprolactone having a number average molecular weight of 1374 and a hydroxy value of 2.4, 80 parts by weight of methyl benzoate and 0.002 parts by weight of tetrabutyl titanate by the same method as that used for producing type A of the terminal-modified polycaprolactone in Example 3.

The properties of the resultant molded products are indicated in Table 11.

TABLE 11

| | | | Example No. | | | |
|---|---|---|---|---|---|---|
| | | | Example | | Comparative Example | |
| | | | 45 | 46 | 22 | 23 |
| Composition (part by weight) | Polyethylene terephthalate | | 58 | 58 | 58 | 57 |
| | Glass fiber | | 30 | 30 | 30 | 30 |
| | Terminal-modified polycaprolactone | Type | A | D | B | A |
| | | Molecular weight | 740 | 1374 | 50,000 | 740 |
| | | Hydroxyl value | 2.1 | 2.4 | 1.0 > | 2.1 |
| | | Amount | 5 | 5 | 5 | 16 |
| | Talc | | 5 | 5 | 5 | 5 |
| | Phosphorous acid | | 1 | 1 | 1 | 1 |
| | Epoxy compound DGT | | 1 | 1 | 1 | 1 |

TABLE 11-continued

| | | Example No. | | | |
|---|---|---|---|---|---|
| | | Example | | Comparative Example | |
| | | 45 | 46 | 22 | 23 |
| Property of molded product | Deflection temperature (°C.) | 208 | 209 | 72 | 128 |
| | Molding shrinkage (%) | 1.6 | 1.4 | 0.4 | 1.2 |
| | Heat shrinkage (%) | 0.10 | 0.11 | 1.11 | 0.13 |
| | Appearance | Satisfactory | Satisfactory | Unsatisfactory | Unsatisfactory |
| | Tensile strength (Kg/cm$^2$) | 1520 | 1490 | 1490 | 910 |
| | Flexural strength (Kg/cm$^2$) | 2200 | 2110 | 2130 | 1280 |

EXAMPLES 47 THROUGH 53

In each of the Examples 47 through 53, the same procedures as those described in Example 41 were carried out, except that the molding pellets had the composition indicated in Table 12 and the polyethylene terephthalate resin was dried at a temperature of 150° C. for 3 hours.

Also, the molding procedure was carried out twice cylinder temperatures of 270° C. and 300° C.

The properties of the resultant molded products are shown in Table 12.

2. The terminal-modified polycaproractone had a number average molecular weight of 1020 and a hydroxyl value of 4.7.

3. The molding pellets contained 0.5 parts by weight of the epoxy compound DGT as a further additional additive.

The resultant molded product had a satisfactory glossy appearance and the following properties.
Deflection temperature: 196° C.
Molding shrinkage: 1.0%
Heat shrinkage: 0.09%
Tensile strength: 1170 kg/cm$^2$

TABLE 12

| | Composition (part by weight) | | | | | | | | |
|---|---|---|---|---|---|---|---|---|---|
| Example No. | Polyethylene terephthalate | Glass fiber | Terminal-modified polycaprolactone | | Crystal nucleating agent | | Phosphorus compound | | Epoxy compound |
| | | | Type | Amount | Type | Amount | Type | Amount | DGT |
| 47 | 62.5 | 30 | A | 6 | Sodium palmitate | 0.4 | Triphenyl phosphate | 1 | 0 |
| 48 | 63.1 | " | A | 6 | Sodium palmitate | " | — | 1 | 0.5 |
| 49 | 62.1 | " | A | 6 | Sodium palmitate | " | Triphenyl phosphate | 1 | 0.5 |
| 50 | 62.6 | " | A | 6 | Sodium palmitate | " | Phosphonic acid | 0.5 | 0.5 |
| 51 | 59 | " | D | 7 | Ionic (*) copolymer | 3 | Phosphoric acid | 1 | 0 |
| 52 | 58.7 | " | D | 7 | Ionic (*) copolymer | 3 | Phosphoric acid | 1 | 0.3 |
| 53 | 63.1 | " | D | 5 | Sodium benzoate | 0.5 | Dimethyl phosphinate | 0.1 | 0.7 |

| | Property of molded product | | | | | | |
|---|---|---|---|---|---|---|---|
| | | | | Tensile strength (Kg/cm$^2$) Temperature of cylinder (°C.) | | Flexural strength (Kg/cm$^2$) Temperature of cylinder (°C.) | |
| Example No. | Deflection temperature (°C.) | Molding shrinkage (%) | Heat shrinkage (%) | 270 | 300 | 270 | 300 |
| 47 | 213 | 1.6 | 0.08 | 1450 | 1210 | 2020 | 1710 |
| 48 | 210 | 1.4 | 0.12 | 1490 | 1330 | 2060 | 1840 |
| 49 | 212 | 1.5 | 0.09 | 1470 | 1420 | 2050 | 1980 |
| 50 | 213 | 1.6 | 0.09 | 1460 | 1410 | 2070 | 1970 |
| 51 | 214 | 1.6 | 0.06 | 1390 | 1160 | 1850 | 1540 |
| 52 | 215 | 1.6 | 0.07 | 1420 | 1340 | 1910 | 1830 |
| 53 | 211 | 1.5 | 0.10 | 1560 | 1510 | 2280 | 2190 |

Note:
(*) - This was available in a trademark of Serlin A #1555 and made by Du Pont.

Table 12 shows that the combination of the phosphorus compound with the epoxy compound was effective for obtaining excellent tensile and flexural strengthes of the molded product even when the cylinder temperature was elevated to 300° C. in the molding procedure.

EXAMPLE 54

The same procedures as those described in Example 18 were carried out, except for the following items.

1. The polyethylene terephthalate resin was used in an amount of 63 parts by weight.

Flexural strength: 1580 kg/cm$^2$

EXAMPLE 55

The same procedures as those described in Example 19 were carried out, except for the following items.

1. An ionic copolymer, which was available under the trademark of Himilane 1707 made by Mitsui Polychemical Co., Ltd., Japan, was used in an amount of 5 parts by weight in place of talc.

2. Phenyl phenylphosphonate was used in an amount of 0.5 parts by weight in place of trimethyl phosphate.

3. The molding pellets contained 0.5 parts by weight of the epoxy compound DGT as a further additional additive.

The resultant molded product exhibited a satisfactory glossy appearance and the following properties.
Deflection temperature: 203° C.
Molding shrinkage: 1.4%
Heat shrinkage: 0.1%
Tensile strength: 1250 kg/cm$^2$
Flexural strength: 1870 kg/cm$^2$

EXAMPLES 56 THROUGH 58 AND COMPARATIVE EXAMPLES 24 AND 25

In each of the Examples 56 through 58 and Comparative Examples 24 and 25, a blend was prepared from 100 parts by weight of a polyethylene terephthalate which had the intrinsic viscosity indicated in Table 13 and which was dried at a temperature of 140° C. for 4 hours, the amount and the type indicated in Table 13 of a terminal-modified polycaprolactone and the amount and the type of an additive. The blend was melt-kneaded and extruded with an extruder having a cylinder diameter of 65 mm at a barrel temperature of 270° C., and the extruded strand was converted to molding pellets.

The flow value of the melt of the molding pellets was determined at a temperature of 290° C. Also, the molding pellets were molded by using an injection molding apparatus at a cylinder temperature of 270° C., and at a mold temperature of 70° C. under an injection pressure of 800 kg/cm$^2$. The molded product was subjected to the measurement of static strength.

The results are indicated in Table 13.

In Examples 57 the ionic copolymer was the same as that described in Example 45 and the epoxy resin was available under to trademark of Epicoat 828 made by Shell Chemical.

In Example 58, the type E of the terminal-modified polycaprolactone was the same as that described in Example 18.

In view of Example 56 and Comparative Example 24, it is clear that the addition of the terminal-modified polycaprolactone is remarkably effective for increasing not only the melt mobility (flow value), but also, the static strength of the molded product.

In Comparative Example 25, the type B of terminal-modified polycaprolactone having a number average molecular weight of 50,000 is not effective for increasing either the melt mobility of the composition or the static strength of the molded product.

EXAMPLES 59 AND 60 AND COMPARATIVE EXAMPLES 26 THROUGH 33

In each of Examples 59 and 60 and Comparative Examples 26 through 33, the same procedures as those described in Example 1 were carried out, with the following exceptions.

In the molding pellet preparation, polyethylene terephthalate pellets having an intrinsic viscosity of 0.72 and dried of 140° C. for 6 hours were used in an amount indicated in Table 14. The type and amount of the terminal-modified polycaprolactone used were as indicated in Table 14. Also, the amount of glass chopped strands, the type and amount of the crystal nucleating agent, the amount of epoxy compound DGT, the amount of triphenyl phosphate, and the amount of the polyethylene terephthalate pellets were as indicated in Table 14.

The resultant mixture was fed into an extruder having a cylinder diameter of 68 mm and extruded through a die at a barrel temperature of 290° C. The resultant pellets were dried at a temperature of 140° C. for 5 hours.

In the molding procedures, the temperature of the cylinder was 280° C., the temperature of the mold was 70° C., the injection pressure was 600 kg/cm$^2$, the cooling time was 20 seconds, and the time period of one cycle of the procedures was 35 seconds.

The terminal-modified polycaprolactone having a number average molecular weight of 4,240 was prepared by reacting 100 parts by weight of polycaprolactone having terminal hydroxyl radicals thereof and a number average molecular weight of 4,000 which was available under the trademark of Placsel 240 produced by Daicel Co., Ltd., with 75 parts by weight of methyl benzoate in the presence of 0.16 parts by weight of manganese acetate in the same manner as that described in Example 6, and had a hydroxy value not exceeding 2.

The terminal-modified polycaprolactone having a number average molecular weight of 10,000 had a hydroxy value not exceeding 2 and was prepared by reacting 100 parts by weight of polycaprolactone having terminal hydroxyl radicals thereof and a number average molecular weight of 10,000 which was available under the trademark of Placsel H-1 produced by Daicel Co., Ltd., with 56 parts by weight of methyl benzoate in the presence of 0.12 parts by weight of manganese acetate in the same manner as that described in Example 6.

The results are indicated in Table 14.

TABLE 13

| | Composition (part by weight) | | | | | | Result | | |
|---|---|---|---|---|---|---|---|---|---|
| | Polyethylene terephthalate | | Terminal-modified polycaprolactone | | Additive | | Flow value at 270° C. | Static strength | |
| | | | | | | | | Ultimate elongation | Impact strength |
| Example No. | Amount | Intrinsic viscosity | Type | Amount | Type | Amount | | (%) | (kg cm/cm) |
| Example 56 | 100 | 1.1 | A | 7 | Talc | 2 | 0.080 | 54 | 3.5 |
| 57 | " | 0.7 | C | 5 | Ionic copolymer | 2 | 0.068 | 200 | 5.4 |
| | | | | | Epoxy resin | 1 | | | |
| 58 | " | 0.7 | E | 10 | Sodium palmitate | 0.3 | 0.076 | 180 | 4.8 |
| | | | | | DGT | 1 | | | |
| Comparative 24 | " | 1.1 | none | — | Talc | 2 | 0.038 | 32 | 3.2 |
| Example 25 | " | 1.1 | B | 7 | Talc | 2 | 0.042 | 28 | 2.6 |

TABLE 14

| Example No. | PET | Glass Fiber | Terminal modified polycaprolactone MW | Terminal modified polycaprolactone Amount | Crystal nucleating agent Type | Crystal nucleating agent Amount | Epoxy compound DGT Amount | Triphenyl phosphate | Deflection temperature (°C.) | Molding shrinkage | Heat shrinkage | Tensile strength (Kg/cm²) | Flexural strength (Kg/cm²) |
|---|---|---|---|---|---|---|---|---|---|---|---|---|---|
| Example 59 | 58.5 | 30 | 740 (Type A) | 6 | Talc | 5 | 1 | 0.5 | 209 | 1.7 | 0.10 | 1470 | 2150 |
| Example 60 | 58.5 | 30 | 1405 (Type C) | 6 | " | 5 | 1 | 0.5 | 210 | 1.6 | 0.12 | 1460 | 2140 |
| Comparative Example 26 | 63.5 | 30 | 740 (Type A) | 6 | none | — | 1 | 0.5 | 76 | 0.5 | 1.3 | 1500 | 2170 |
| Comparative Example 27 | 63.5 | 30 | 1405 (Type C) | 6 | " | — | 1 | 0.5 | 75 | 0.5 | 1.3 | 1510 | 2170 |
| Comparative Example 28 | 63.5 | 30 | 4240 | 6 | " | — | 1 | 0.5 | 77 | 0.6 | 1.2 | 1500 | 2160 |
| Comparative Example 29 | 63.5 | 30 | 10000 | 6 | " | — | 1 | 0.5 | 73 | 0.5 | 1.3 | 1520 | 2180 |
| Comparative Example 30 | 63.5 | 30 | 50000 (Type B) | 6 | " | — | 1 | 0.5 | 70 | 0.5 | 1.3 | 1500 | 2170 |
| Comparative Example 31 | 58.5 | 30 | 4240 | 6 | Talc | 5 | 1 | 0.5 | 156 | 1.1 | 0.4 | 1450 | 2140 |
| Comparative Example 32 | 58.5 | 30 | 10000 | 6 | " | 5 | 1 | 0.5 | 118 | 0.7 | 0.8 | 1460 | 2150 |
| Comparative Example 33 | 58.5 | 30 | 50000 (Type B) | 6 | " | 5 | 1 | 0.5 | 78 | 0.6 | 1.10 | 1470 | 2150 |

In Comparative Examples 26 to 30, wherein no talc was used as a crystal nucleating agent, the resultant molded products exhibited an undesirably low deflection temperature and an excessively large molding shrinkage independently from the value of the number average molecular weight of the terminal modified polycaprolactones used. This phenomena suggested that the polyester resins in the molded products were not satisfactorily crystallized.

In Examples 59 and 60 in accordance with the present invention, the resultant molded products exhibited a satisfactorily high deflection temperature and small molding shrinkage.

In Comparative Examples 31 to 33, in which the terminal-modified polycaprolactones used had a large number average molecular weight, the resultant molded products exhibited a large molding shrinkage and a low deflection temperature. This phenomenon suggests that the polyester resin in the molded products was not sufficiently crystallized.

COMPARATIVE EXAMPLE 34

The same procedures as those described in Comparative Example 3 were carried out except that the polyethylene terephthalate was used in an amount of 65 parts by weight, the same type of terminal-modified polycaprolactone as that described in Example 1 was used in an amount of 5 parts, and no sodium palmitate was used.

The resultant molded product exhibited an unsatisfactory appearance and the following properties.
Deflection temperature: 75° C.
Molding shrinkage: 0.5%
Heat shrinkage: 1.6%
Tensile strength: 1530 kg/cm²
Flexural strength: 2180 kg/cm²
Flexural elasticity: 90,000 kg/cm²

We claim:

1. A polyethylene terephthalate resin composition comprising:
   (A) per 100 parts by weight of said polyethylene terephthalate resin, 0.1 to 30 parts by weight of a polycaprolactone having a number average molecular weight of from 200 to 2000 and 50% or more of its entire number of terminal radicals modified to be non-reactive and
   wherein said polyethylene terephthalate resin has an intrinsic viscosity of from 0.35 or more determined in orthochlorophenol at a temperature of 35° C.;
   (B) 0.01 to 10 parts by weight of a crystal nucleating agent for said polyethylene terephthalate resin, per 100 parts by weight of said resin; and
   (C) 5 to 200 parts by weight of an inorganic filler, per 100 parts by weight of said polyethylene terephthalate resin.

2. A polyethylene terephthalate resin composition as claimed in claim 1, wherein said modified terminal radicals of the polycaprolactone molecules are of the formula (I)

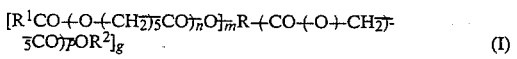
(I)

wherein n and p respectively represent, independently from each other, an integer of 2 or more; m and q respectively represent, independently from each other, zero or an integer o from 1 to 4, the sum of m and q being 1 or more; R represents an organic radical having a valence corresponding to the sum of m and q; and R¹ and R² respectively represent, independently from each other, a monovalent organic radical.

3. A polyethylene terephthalate resin composition as claimed in claim 1, wherein said inorganic filler comprises at least one member selected from the group consisting of glass fibers, asbestos, carbon fibers, potassium titanate fibers, and mica, silica, talc, calcium carbonate, glasses, clay and wollastonite in the forms of particles, grains, flakes and small plates.

4. A polyethylene terephthalate resin composition as claimed in claim 1, wherein said crystal nucleating agent comprises at least one member selected from the group consisting of salts of carboxylic acids with metals of Groups I and II in the periodic table, talc and ionic copolymers of $\alpha$-olefins with salts of $\alpha$, $\beta$-unsaturated carboxylic acid with metals of Group I and II in the periodic table.

5. A polyethylene terephthalate resin composition as claimed in claim 1, which additionally contains, per 100 parts by weight of said polyethylene terephthalate resin, 0.01 to 2 parts by weight or less of at least one phosphorus compound selected from those of the formulae (II) and (III):

and

wherein X, Y and Z respectively represent, independently from each other, a member selected from the group consisting of a hydrogen atom, monovalent hydrocarbon radials and radicals of the formula —OR$^3$ in which R$^3$ represents a member selected from a hydrogen atom and monovalent hydrocarbon radicals.

6. A polyethylene terephthalate resin composition as claimed in claim 5, wherein said monovalent hydrocarbon radicals represented by R$^3$ are selected from substituted and unsubstituted alkyl, aralkyl and aryl radicals each having 12 carbon atoms or less.

7. A polyethylene terephthalate resin composition as claimed in claim 5, wherein said monovalent hydrocarbon radicals represented by X, Y and/or Z are selected from substituted and unsubstituted alkyl, aralkyl and aryl radicals each having 12 carbon atoms or less.

8. A polyethylene terephthalate resin composition as claimed in claim 5, which additionally contains, per 100 parts by weight of said polyethylene terephthalate resin, 3 parts by weight or less of at least one epoxy compound selected from those of the formula (IV):

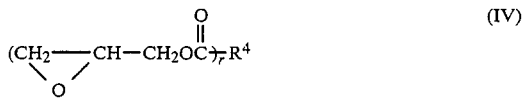

wherein r represents an integer of 2 or more and R$^4$ represents a r-valent hydrocarbon radicals together with said phosphorus compound.

9. A polyester resin compositon as claimed in claim 8, wherein said hydrocarbon radical represented by R$^4$ is selected from alkylene radicals having 1 to 16 carbon atoms, cyclic alkylene radicals having 5 to 16 carbon atoms, phenylene, naphthylene, methylphenylene, and aromatic radicals of the formulae:

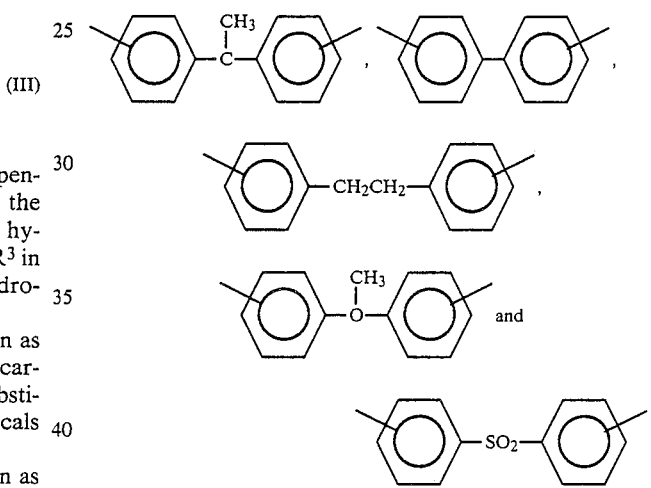

* * * * *